(12) United States Patent
Inoue et al.

(10) Patent No.: US 8,552,981 B2
(45) Date of Patent: Oct. 8, 2013

(54) MULTIDIRECTIONAL INPUT DEVICE AND ELECTRONIC APPARATUS COMPRISING IT

(75) Inventors: Hiroto Inoue, Kyoto (JP); Hiroyasu Okada, Hyogo (JP); Tamotsu Yamamoto, Hyogo (JP); Masaki Sawada, Osaka (JP); Keiji Kaizaki, Osaka (JP)

(73) Assignee: Panasonic Corporation, Osaka (JP)

( * ) Notice: Subject to any disclaimer, the term of this patent is extended or adjusted under 35 U.S.C. 154(b) by 1624 days.

(21) Appl. No.: 10/914,466

(22) Filed: Aug. 10, 2004

(65) Prior Publication Data

US 2005/0007341 A1 Jan. 13, 2005

Related U.S. Application Data

(62) Division of application No. 10/089,516, filed as application No. PCT/JP01/06623 on Aug. 1, 2001, now Pat. No. 6,794,982.

(30) Foreign Application Priority Data

Aug. 3, 2000 (JP) ................................. 2000-235426
Apr. 6, 2001 (JP) ................................. 2001-108179

(51) Int. Cl.
*G09G 5/00* (2006.01)
*G09G 5/08* (2006.01)
*G06F 3/033* (2013.01)

(52) U.S. Cl.
USPC ........................... 345/160; 345/156; 345/169

(58) Field of Classification Search
USPC ................... 345/156–184; 200/5 C–5 E, 600
See application file for complete search history.

(56) References Cited

U.S. PATENT DOCUMENTS

| 4,088,855 A | | 5/1978 | Emery | |
|---|---|---|---|---|
| 4,246,452 A | * | 1/1981 | Chandler | ...................... 200/5 A |
| 5,689,285 A | | 11/1997 | Asher | |
| 6,069,552 A | * | 5/2000 | Van Zeeland | ................... 338/92 |

(Continued)

FOREIGN PATENT DOCUMENTS

| EP | 0164316 | 12/1991 |
|---|---|---|
| JP | 5-324185 | 12/1993 |
| JP | 6-295641 | 10/1994 |
| JP | 7-84717 | 3/1995 |
| JP | 8-6714 | 1/1996 |

(Continued)

OTHER PUBLICATIONS

US2001/0008380 Serban et al. (Jul. 2001).

*Primary Examiner* — Srilakshmi K Kumar

(74) *Attorney, Agent, or Firm* — Wenderoth, Lind & Ponack, L.L.P.

(57) ABSTRACT

A multidirectional input device includes ring-shaped resistance element layer 18, first conductive layer 22 and second conductive layer 23 shaping in arcs corresponding to resistance element layer 18, and knob 14 having ring-shaped protruded section 14D. Resistance element layer 18 has at least a pair of electrodes and is formed on flexible insulating substrate 16. Protruded section 14D brings resistance element layer 18 into contact with first conductive layer 22 or second conductive layer 23 when the knob is tilted. When a given voltage is applied to the electrodes and the knob is tilted, resistance element layer 18 comes in contact with first conductive layer 22 or second conductive layer 23, so that an output signal of a high resolution concerning a tilt angle can be obtained. The output signal is supplied to a microprocessor and calculated, then an angle or a direction is detected and recognized.

12 Claims, 30 Drawing Sheets

(56) References Cited

U.S. PATENT DOCUMENTS

| | | | |
|---|---|---|---|
| 6,087,925 A * | 7/2000 | DeVolpi | 338/92 |
| 6,137,063 A * | 10/2000 | Jiang | 174/261 |
| 6,437,682 B1 | 8/2002 | Vance | |
| 6,437,772 B1 * | 8/2002 | Zimmerman et al. | 345/160 |
| 6,781,576 B2 * | 8/2004 | Tamura | 345/173 |
| 7,034,806 B2 * | 4/2006 | Nakagawa | 345/168 |

FOREIGN PATENT DOCUMENTS

| | | |
|---|---|---|
| JP | 10-12097 | 1/1998 |
| JP | 10-125180 | 5/1998 |
| JP | 11081571 | 3/1999 |
| JP | 11-126126 | 5/1999 |
| JP | 11-144567 | 5/1999 |
| JP | 3069727 | 4/2000 |

* cited by examiner

MULTIDIRECTIONAL INPUT DEVICE AND ELECTRONIC APPARATUS COMPRISING IT

This is a Divisional Application of U.S. application Ser. No. 10/089,516, filed Jul. 19, 2002 now U.S. Pat. No. 6,794,982, which is the National Stage of International Application No. PCT/JP01/06623, filed Aug. 1, 2001.

TECHNICAL FIELD

The present invention relates to a multidirectional input device and an electronic apparatus using the same. The multidirectional input device is used for inputting and controlling of an electronic apparatus, e.g., a cellular phone, an information terminal, a game apparatus, and a remote controller.

BACKGROUND ART

A conventional multidirectional input device disclosed in Japanese Patent Application Non-Examined Publication No. H10-125180 is described hereinafter with reference to FIGS. 36, 37 and 38. FIG. 36 shows a sectional view of a multidirectional control switch as an electronic component used in a multidirectional input device, and FIG. 37 shows an exploded perspective view of the switch. In FIGS. 36, 37 and 38, domed contact 2 made of thin elastic metal plate is placed in a center of box-shaped casing 1 made of insulated resin. Four outer fixed contacts 3 conduct each other and are placed on inner bottom of box-shaped casing 1. A rim of domed moving contact 2 rests on outer fixed contacts 3. Independent four inner-fixed contacts 4 (4A, 4B, 4C, 4D) are located inside of outer fixed contacts 3. Four inner-fixed contacts 4 are equidistant and equiangular from a center of domed moving contact 2. Output terminals (not shown) conducted to respective contacts 4 electrically are located outside of box-shaped casing 1.

An opening of top surface of box-shaped casing 1 is covered with cover 5. Operating section 6 is formed of frame 6A and flange 6B. Flange 6B is incorporated beneath frame 6A. Frame 6A protrudes from through-hole 5A, which is punched at the center of cover 5. Flange 6B does not rotate but can tilt, because perimeter of flange 6B is mated with inner wall 1A of box-shaped casing 1. Flange 6B has four pressing sections 7 (7A, 7B, 7C, 7D, (7D is not shown)) corresponding to four inner-fixed contacts 4 (4A, 4B, 4C, 4D) beneath its lower surface. Four pressing sections 7 come in contact with upper surfaces of domed moving contact 2, and an upper surface of flange 6B is pressed by a lower surface of cover 5. As a result, operating section 6 stands vertically to a bottom of box-shaped casing 1 and takes a neutral position (hereinafter it is called vertical-neutral position).

As shown with an arrow mark in FIG. 38, when upper left side of knob 8 put on frame 6A is pressed, operating section 6 is fulcrumed at upper right side of flange 6B and tilts from the vertical-neutral position of FIG. 36. Pressing sections 7A presses domed moving contact 2, so that a part of contact 2 bows downward resiliently. Domed moving contact 2 comes in contact with inner-fixed contact 4A, and contact 4A shorts with outer fixed contacts 3. As a result, the multidirectional control switch is turned ON and an electric signal is supplied to outside via respective output terminals. When pressure of knob 8 is removed, operating section 6 returns to the original vertical-neutral position by elastic restoring force of domed moving contact 2. Outer fixed contacts 3 and inner-fixed contact 4A are separated and the multidirectional control switch is turned OFF.

A multidirectional device using the multidirectional control switch supplies an electric signal to a microprocessor for calculation, thereby recognizing an input direction and outputting a signal responsive to the direction, where the electric signal shows which of inner-fixed contacts 4 is connected to outer fixed contacts 3.

In the conventional multidirectional control switch, the number of directions can be input (resolution of input directions) depends on the number of inner-fixed contacts 4. Because domed moving contact 2 bows downward resiliently and comes in contact with contacts 4 when operating section 6 is tilted by knob 8. Since an electronic apparatus becomes downsized recently, electronic components used in the apparatus are required to be smaller. The conventional switch is difficult to increase the number of inner-fixed contacts 4 more than four, because the component should be smaller and a high resolution as well as stable operation is required.

Resolution of eight directions is obtainable as follows. Operating section 6 tilts toward the middle between inner-fixed contacts 4, and both of adjacent contacts 4 become simultaneously ON within a given time. Switch-recognizing means for recognizing simultaneous ON state is formed of a microprocessor and recognizes the difference between the simultaneous ON state and an individual ON state by respective four inner-fixed contacts 4 as a different signal. In this case, resolution of eight directions is obtained, but this is the maximum resolution by the conventional method.

SUMMARY OF THE INVENTION

The present invention addresses the problem discussed above, and aims to provide a multidirectional input device and an electronic apparatus using the same. The multidirectional input device can be small enough to be used in an apparatus downsized recently and has a high resolution of input direction.

The multidirectional input device of this invention includes the following elements:

(a) a ring-shaped resistance element layer formed on an insulating substrate, (b) a conductive section disposed on a plane substrate which is spaced from said resistance element layer at a given insulating space, and (c) an operating section for bringing the resistance element layer into contact with the conductive section partially.

When the insulating substrate or the plane substrate is pressed using the operating section, the resistance element layer comes in contact with the conductive section partially. If a given voltage is applied to the resistance element layer at that time, the multidirectional input device can detect the contacted position using a signal obtained at the conductive section.

DETAILED DESCRIPTION OF THE PREFERRED EMBODIMENTS

Exemplary embodiments of the present invention are demonstrated hereinafter with reference to FIG. 1 through FIG. 35.

Exemplary Embodiment 1

The first exemplary embodiment is described hereinafter with reference to the accompanying drawings.

Figure 1:
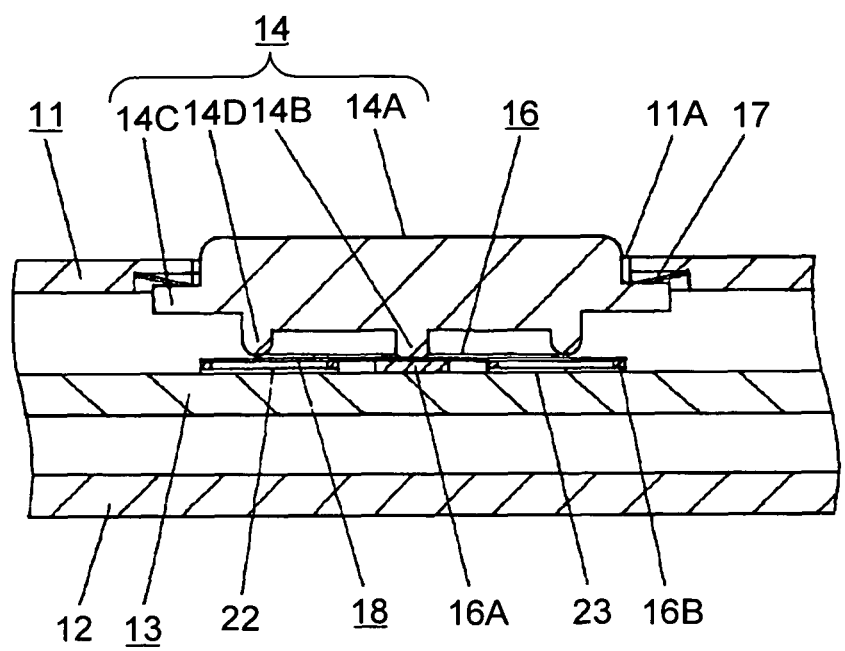
FIG. 1 shows a sectional view of an essential part of a cellular phone as an electronic apparatus using a multidirectional input device in accordance with a first exemplary embodiment of the present invention.
Figure 2:
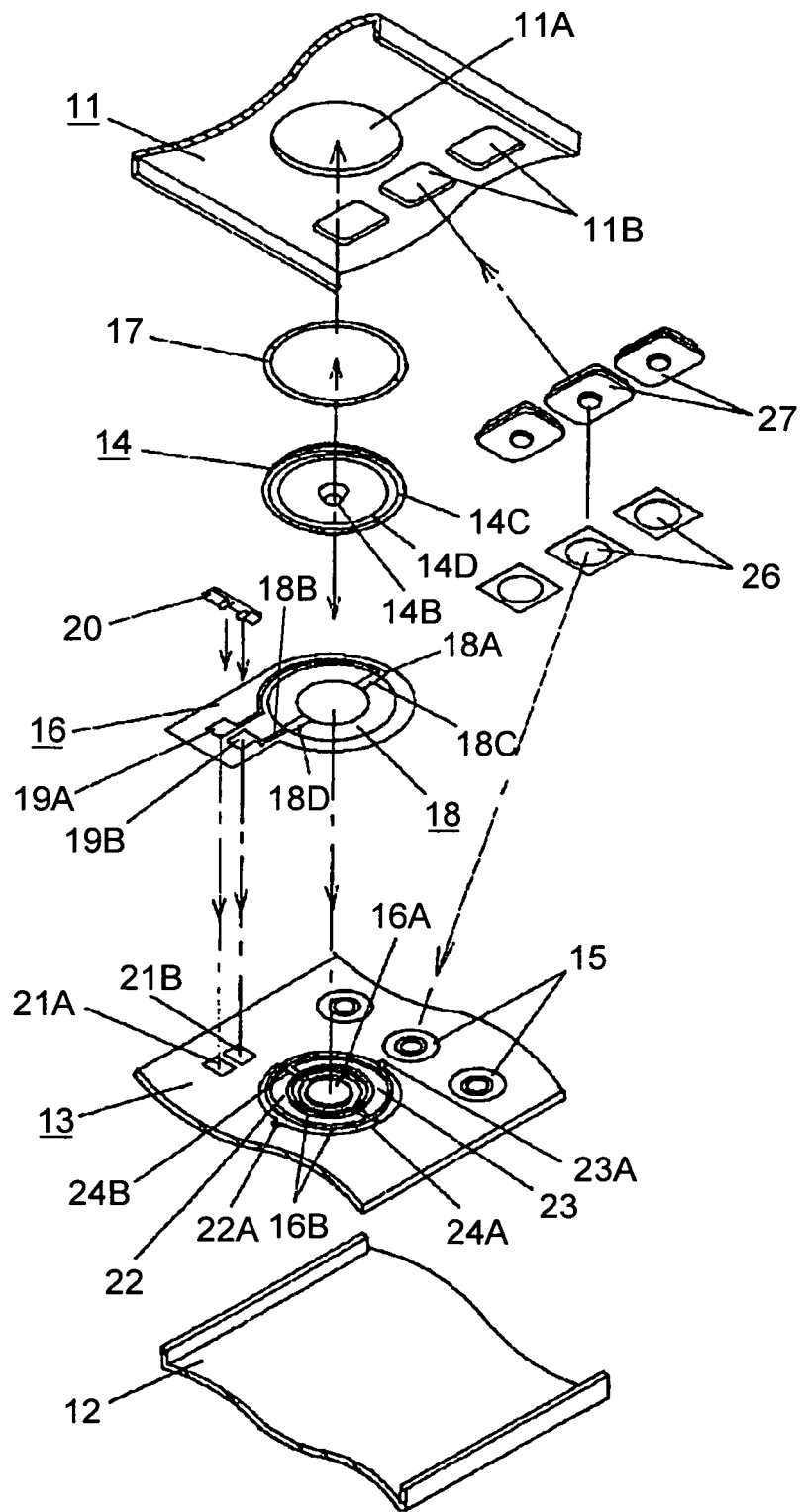
FIG. 2 shows an exploded perspective view of the multidirectional input device used in the cellular phone in accordance with the first embodiment of the invention.

FIG. 1 shows a sectional view of an essential part of a multidirectional input device used in a cellular phone in accordance with the first exemplary embodiment of the present invention. FIG. 2 shows an exploded perspective view of the multidirectional input device. In FIG. 1 and FIG. 2, plane printed circuit substrate 13 having wiring in multi-layers is accommodated between top casing 11 and bottom casing 12, and retained by bottom casing 12. Upper surface 14A of knob 14 (an operating section) protrudes from circular-through-hole 11A, which is punched at a given position of top casing 11, and the upper surface of top casing 11 is an operating area. Fixed contact 15 used for switches of various functions are disposed on printed circuit substrate 13.

Protrusion 14B at the center of lower surface of knob 14 comes in contact with printed circuit substrate 13 via flexible insulating substrate 16 and spacer 16A located under substrate 16, so that knob 14 is retained and can tilt to every direction. Knob 14 stands substantially vertical to substrate 16 by an energising force of ring-shaped flat spring 17, where flat spring 17 is disposed between an upper surface of perimeter of flange 14C and a lower surface of perimeter of through-hole 11A, and bows up and down resiliently. In this state, ring-shaped protruded section 14D beneath knob 14 solidly comes in contact with an upper surface of flexible insulating substrate 16. The center of section 14D and that of protrusion 14B are the same position, and substrate 16 is disposed on printed circuit substrate 13.

As shown in FIG. 2, ring-shaped resistance element layer 18 is printed on a lower surface of flexible insulating substrate 16, where layer 18 has an uniform surface resistance and a ring-width of layer 18 is uniform. Good conductors (electrodes) 18C and 18D, which have given widths, are formed symmetrically with respect to the center of layer 18. A pair of leads 18A and 18B is routed from good conductors 18C and 18D. Leads 18A and 18B are routed to respective terminals 19A and 19B formed on the corner of substrate 16. Terminals 19A and 19B are pressed from the upper surface of substrate 16 by pressing spring 20 and are kept in contact with connection points 21A and 21B on printed circuit substrate 13. A radius of ring-shaped protruded section 14D beneath knob 14 is designed to be substantially equal to a middle value between a radius of internal ring and that of external ring of resistance element layer 18, and flexible insulating substrate 16 is bonded to printed circuit substrate 13 as mentioned. Two insulating spacers 16B which have given thickness are placed on printed circuit substrate 13, such that spacers 16B corresponds to internal ring and external ring of resistance element layer 18, so that parts of layer 18 are spaced from printed circuit substrate 13 at a given distance. First conductive layer 22 and second conductive layer 23 are disposed on printed circuit substrate 13 corresponding to resistance element layer 18. Insulating spacer 16B can be also placed on flexible insulating substrate 16. First conductive layer 22 and second conductive layer 23, which are insulated each other by two insulating sections 24A and 24B, shape in arcs having wide widths and have respective leads 22A and 23A. Insulating sections 24A and 24B correspond to a pair of electrodes 18C and 18D of resistance element layer 18.

Figure 4:
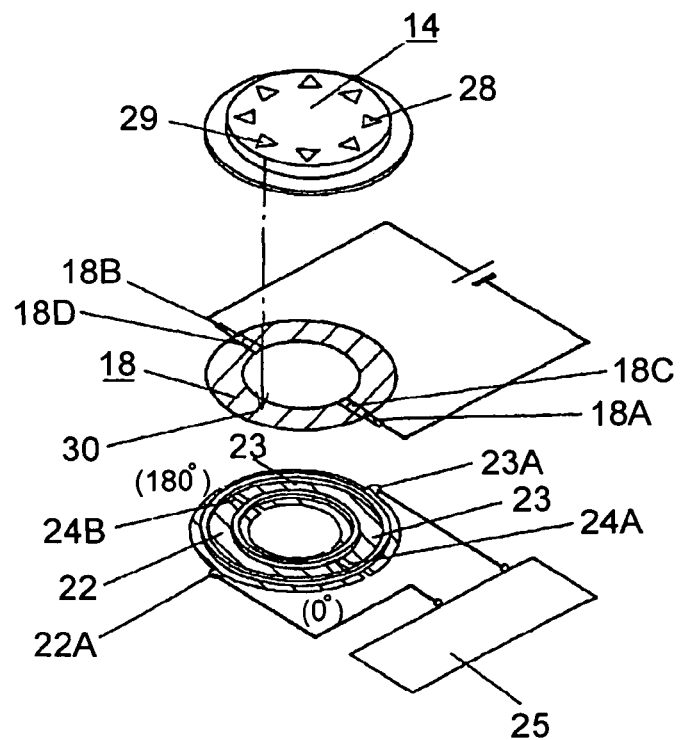
FIG. 4 shows a schematic view illustrating a structure of the multidirectional input device used in the cellular phone in accordance with the first embodiment of the invention.

Widths of two insulating sections 24A and 24B are narrower than those of electrodes 18C and 18D of resistance element layer 18. As shown in FIG. 4, leads 22A and 23A are connected to microprocessor 25 included in the cellular phone via multi-wiring section (not shown) of printed circuit substrate 13.

The multidirectional input device used in the cellular phone in accordance with the embodiment is formed as described above. As shown in FIG. 2, a switch of the cellular phone is formed of fixed contact 15, moving contact 26 and switch 27. When switch 27 exposed from small aperture 11B of top casing 11 is pressed, the cellular phone is operated.

Figure 3:
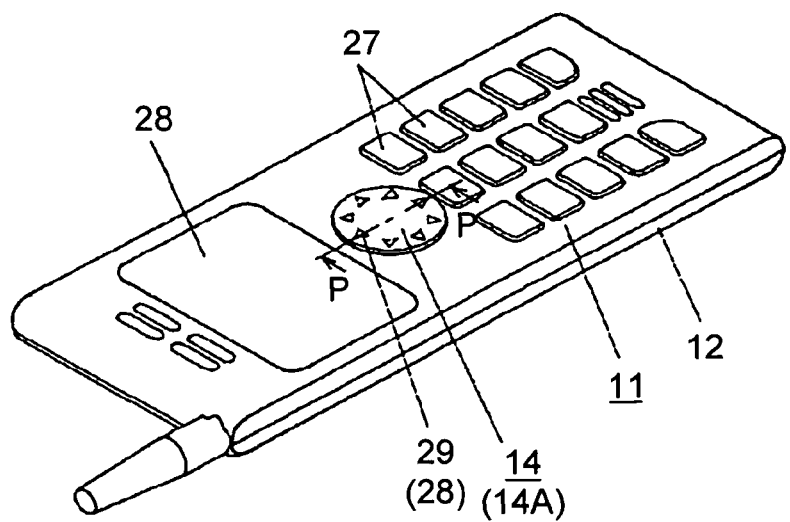
FIG. 3 is a perspective view showing an outlook of the cellular phone in accordance with the first embodiment of the invention.
Figure 5:
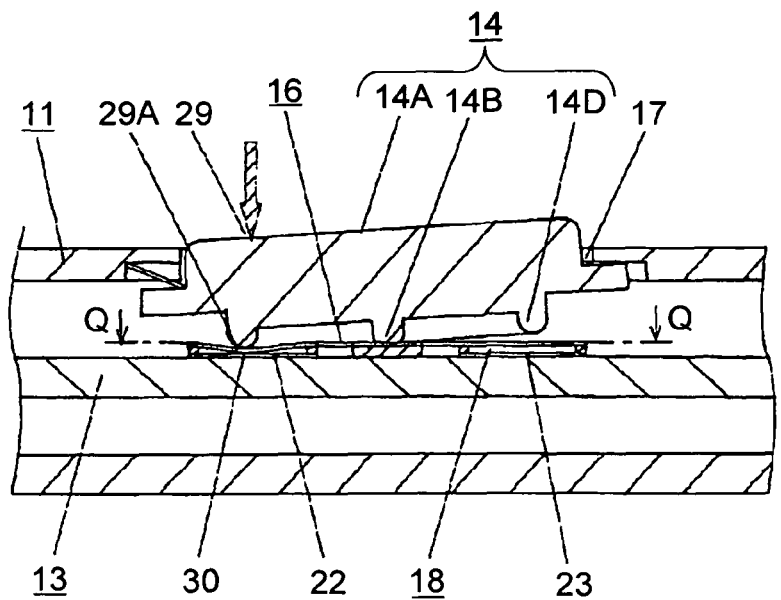
FIG. 5 shows a sectional view along line P-P in FIG. 3.

An operation of the multidirectional input device is described as follows. FIG. 3 is a perspective view showing an outlook of the cellular phone in accordance with the first embodiment. FIG. 4 shows a schematic view illustrating a structure of the multidirectional input device used in the cellular phone in accordance with the first embodiment. As shown in FIG. 4, a given DC voltage is applied between lead 18A and lead 18B of resistance element layer 18 beneath flexible insulating substrate 16 via connection points 21A and 21B on printed circuit substrate 13 (shown in FIG. 2). Knob 14 is exposed on top casing 11 in FIG. 3. When point 29 to be pressed of left side (display area 28 side) of the upper surface 14A of knob 14 is pressed downward, knob 14 tilts to left side with respect to protrusion 14B against the energising force of ring-shaped flat spring 17. Knob 14 tilts from an original position in FIG. 1 to the position in FIG. 5 showing a sectional view of the cellular phone along line P-P in FIG. 3.

Point 29A corresponding to point 29 is a point of a lower surface of ring-shaped protruded section 14D. The protruded section 14D presses the upper surface of substrate 16 and bends it downward partially at point 29A. Contact point 30 of resistance element layer 18 of lower surface of substrate 16 partially comes in contact with first conductive layer 22 for conduction. As a result, an output voltage (voltage VI), which is determined by a resistance value between contact point 30 and lead 18A of resistance element layer 18, is supplied to lead 22A of first conductive layer 22 and is input to microprocessor 25 in FIG. 4. At that time, an output voltage (voltage VII) is not generated at lead 23A of second conductive layer 23.

When pressure of upper surface 14A of knob 14 is removed, knob 14 returns to the substantially vertical position (the original position) in FIG. 1. Contact point 30 of resistance element layer 18 of the lower surface of substrate 16 is separated from first conductive layer 22 by resilient force of substrate 16 itself.

When a right side (switch 27 side) of the upper surface 14A of knob 14 is pressed downward and knob 14 tilts to right, the output voltage (voltage VII) generated at lead 23A of second conductive layer 23 is supplied and is input to microprocessor 25. At that time, the output voltage (voltage VI) is not generated at lead 22A of first conductive layer 22.

Figure 6:
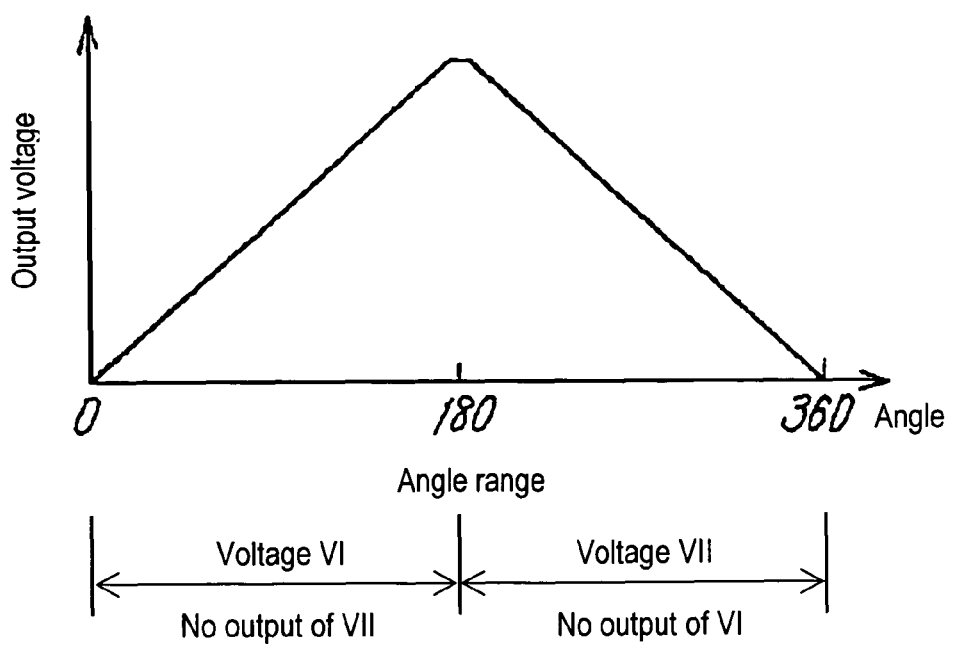
FIG. 6 is a graph showing an output voltage of the multidirectional input device in accordance with the first embodiment of the invention.

As shown in a schematic view of FIG. 4, a position of insulating section 24A is determined as a base point (0°) and a position of insulating section 24B is determined as a middle point (180°). FIG. 6 shows a relation between a position of contact point 30 of resistance element layer 18 and the output voltage (voltage VI) generated at lead 22A of first conductive layer 22 or the output voltage (voltage VII) generated at lead 23A of second conductive layer 23.

As shown in FIG. 6, when knob 14 tilts at an angle ranging from 0° to 180°, only voltage VI is generated, and when knob 14 tilts at an angle ranging from 180° to 360° in tilt angle, only voltage VII is generated. At the base point (0°) and the middle point (180°) which are borders between first conductive layer 22 and second conductive layer 23, the position of contact point 30 of resistance element layer 18 corresponds to respective electrodes 18C and 18D of leads 18A and 18B. Since the width of electrodes 18C and 18D are wider than those of insulating sections 24A and 24B, first conductive layer 22 and second conductive layer 23 short with good conductors 18C or 18D, and take the same voltage level. As a result, output voltages VI and VII become 0V at the point of 0° and 360° and the output voltage becomes maximum at the point of 180°.

The point (lead 22A or lead 23A) generating the output voltage is detected using the microprocessor which receives the output voltages (voltages VI or VII) and information of magnitude of the output voltage is calculated by the microprocessor, so that a tilt angle of knob 14 can be recognized.

Since the multidirectional input device in the present invention has a simple structure formed of resistance element layer 18 on the lower surface of flexible insulating substrate 16, first conductive layer 22, second conductive layer 23 and knob 14, the electronic apparatus is easily downsized. Layer 22 and layer 23 corresponding to layer 18 are disposed on printed circuit substrate 13 of the electronic apparatus in this structure.

When knob 14 tilts to a desired position, resistance element layer 18 comes in contact with either of first conductive layer 22 or second conductive layer 23. At that time, the output voltage corresponding to contact point 30 is generated, and a tilt angle of knob 14 is recognized. The output voltage generated is easily calculated using the microprocessor. As a result, the multidirectional input device of the present invention is accurate, and resolution of a tilt angle of knob 14 (resolution of input directions) is high and, conventional parts can be used for elements, e.g., printed circuit substrate 13, top casing 11.

Figure 7:
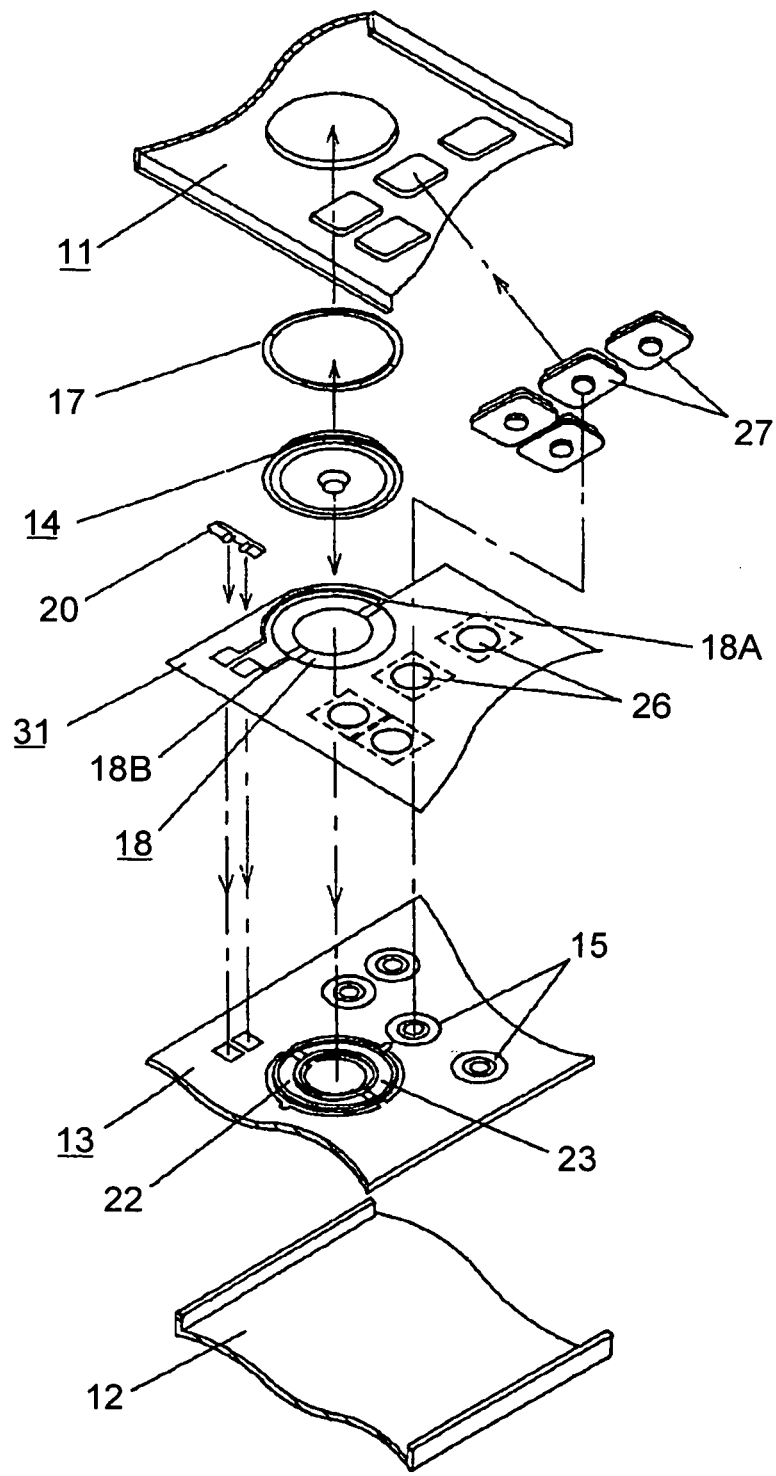
FIG. 7 shows an exploded perspective view of an electronic apparatus using the multidirectional input device in accordance with the first embodiment of the invention.

In this example discussed above, resistance element layer 18 of the multidirectional input device is described as a layer disposed on individual flexible insulating substrates 16. FIG. 7 shows an exploded perspective view of an electronic apparatus using a multidirectional input device which has a different structure from that of FIG. 2. Moving points 26 (switches for various functions) of the multidirectional input device in FIG. 7 are formed collectively on flexible printed circuit substrate 31, and resistance element layer 18 of the multidirectional input device is also formed on the lower surface of flexible printed circuit substrate 31. In the cellular phone using the multidirectional input device, the number of components and processes can be reduced, and electrodes 18C and 18D of resistance element layer 18 can be easily wired, so that an inexpensive cellular phone using the multidirectional input device is obtainable.

Figure 8:
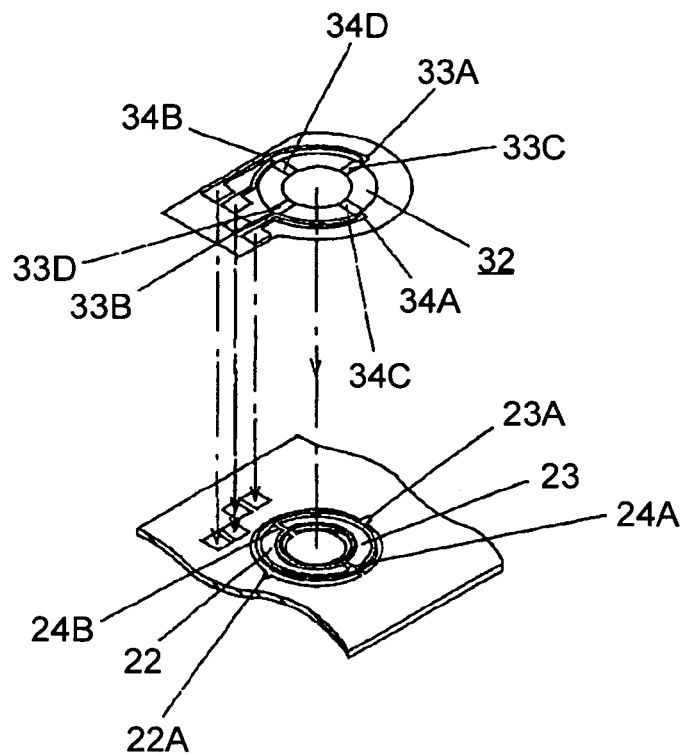
FIG. 8 shows an exploded perspective view of a contact-point of the multidirectional input device in accordance with the first embodiment of the invention.

In this first embodiment, a pair of electrodes 18C and 18D formed on resistance element layer 18 is described. FIG. 8 shows an exploded perspective view of a contact-point of the multidirectional input device which has a different structure from that of FIG. 2. Resistance element layer 32 has a pair of electrodes 33C and 33D, and also has a pair of electrodes 34C and 34D disposed at different positions from electrodes 33C and 33D. As a result, when knob 14 tilts to neighborhoods of respective leads, correct directions can be obtained.

Figure 9:
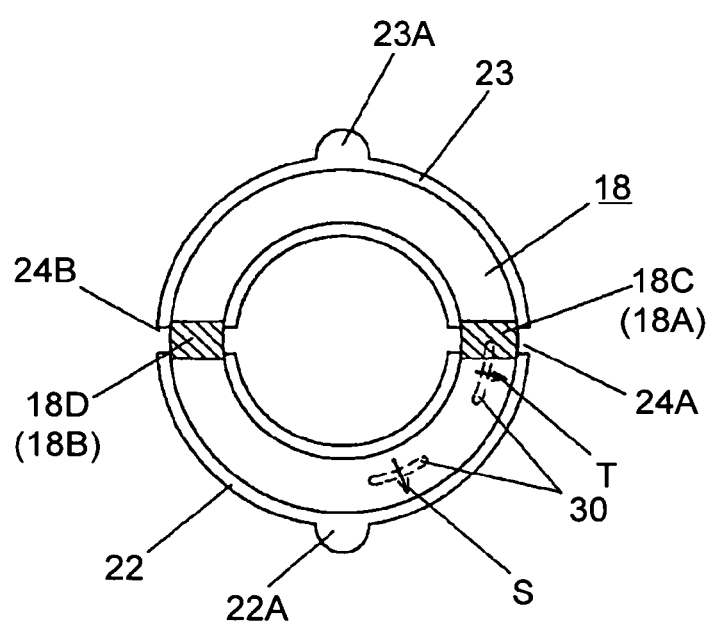
FIG. 9 shows a plan view of a contact-point taken along line Q-Q in FIG. 5.

An operation of the multidirectional input device is described as follows. First, the operation of resistance element layer 18 having a pair of electrodes 18C and 18D is described with reference to FIG. 9 showing a plan view of a contact-point taken along line Q-Q in FIG. 5. When knob 14 tilts, contact point 30 is pressed by ring-shaped protruded section 14D of lower surface of knob 14, and becomes wider to a certain extent, where point 30 is a contact point between layer 18 of a lower surface of substrate 16 and the conductive layer. When knob 14 tilts along arrow mark S (a different direction from a neighborhood of electrodes 18C and 18D of layer 18), an output voltage, which is divided proportionally to resistances of both sides of contact point 30, is generated. The output voltage corresponding to the direction of arrow mark S (tilted direction of knob 14) is obtained.

When knob 14 tilts to arrow mark T deviated clockwise slightly from electrode 18C, contact point 30 between resistance element layer 18 and first conductive layer 22 includes an edge of electrodes 18 C. At that time, a voltage of electrodes 18 C (an output voltage determined by a resistance at lead 18A of resistance element layer 18) is supplied as an output voltage (voltage V1) from lead 22A connected to first conductive layer 22. When knob is tilted to arrow mark T, the output direction does not agree with arrow mark T, but agrees with electrodes 18 C.

On the other hand, the multidirectional input device in FIG. 8 has a pair of electrodes 33C, 33D and a pair of electrodes 34C, 34D on resistance element layer 32 as well as 33A, 33B, 34A and 34B. Leads 33A, 33B, 34A and 34B are routed from respective electrodes 33C, 33D, 34C and 34D. A DC voltage is applied to a pair of leads 33A and 33B, and then applied to a pair of leads 34A and 34B alternately in a short cycle using the microprocessor. An output voltage between lead 22A of first conductive layer 22 and lead 23A of second conductive layer 23 is detected, where the output voltage is synchronized with the short cycle.

Figure 10:
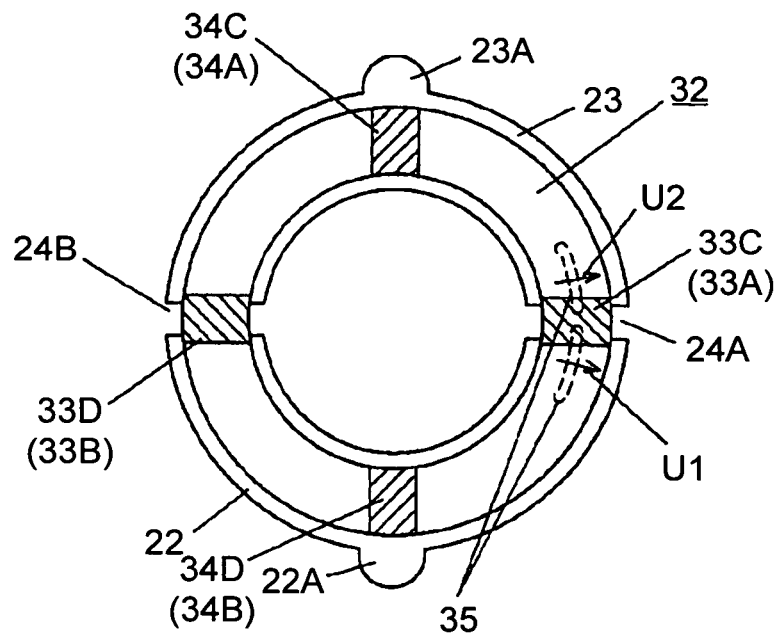
FIG. 10 shows a plan view of an assembled contact-point in which is shown discretely in FIG. 8.

FIG. 10 shows a plan view of an assembled contact-point. Even if knob 14 tilts along arrow mark U1 or U2, an output voltage of lead 22A of layer 22 or lead 23A of layer 23 becomes substantially the same as the voltage divided proportionally to resistances of both sides of contact point 35. At that time, a DC voltage is applied between leads 34A and 34B, and arrow mark U1 or U2 indicates a neighborhood of electrode 33C of resistance element layer 32. The voltage corresponding to the tilt angle is thus obtainable in this example. When knob 14 tilts toward neighborhoods of leads 33A of resistance element layer 32, resolution of directions becomes higher.

Exemplary Embodiment 2

Figure 11:
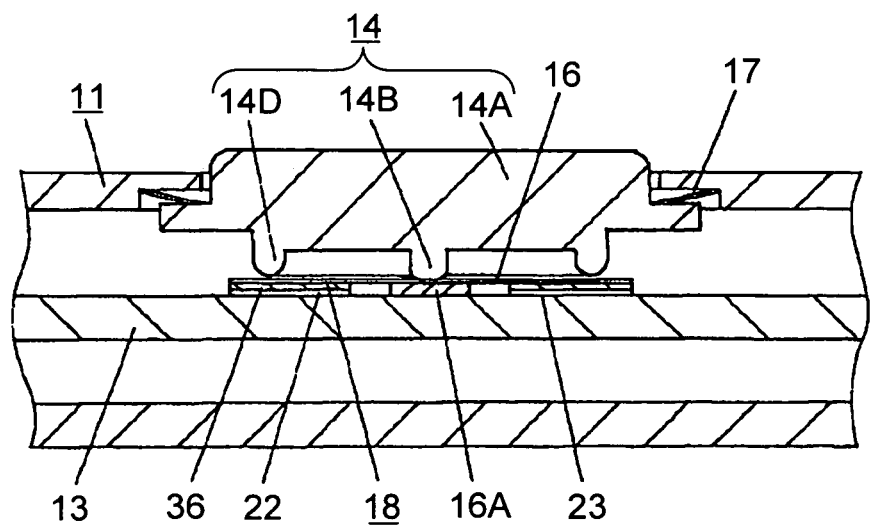
FIG. 11 shows a sectional view of an essential part of a cellular phone as an electronic apparatus using a multidirectional input device in accordance with a second exemplary embodiment of the present invention.

The second exemplary embodiment is described hereinafter with reference to the accompanying drawings. FIG. 11 shows a sectional view of an essential part of a cellular phone using a multidirectional input device in accordance with the second exemplary embodiment of the present invention.

Figure 12:
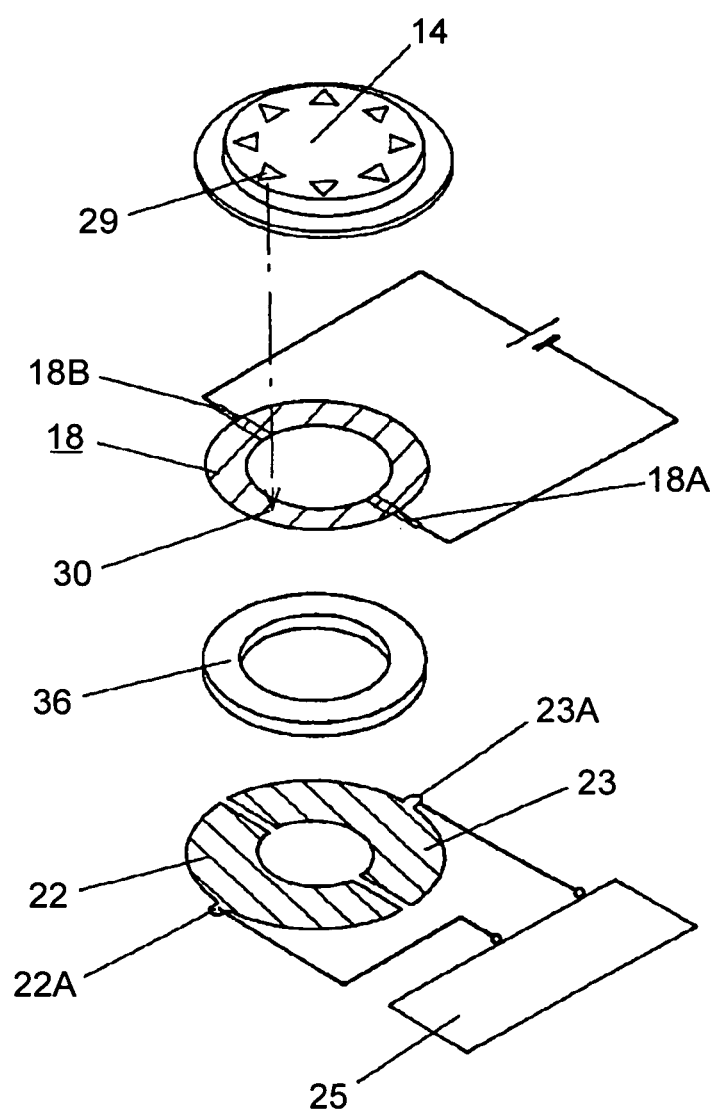
FIG. 12 shows a schematic view illustrating a structure of the multidirectional input device used in the cellular phone in accordance with the second embodiment of the invention.

FIG. 12 shows a schematic view of the same multidirectional input device used in the cellular phone.

The multidirectional input device of the first embodiment has insulating spacers 16B between ring-shaped resistance element layer 18 on a lower surface of flexible insulating substrate 16 and first conductive layer 22 or second conductive layer 23 on printed circuit substrate 13. As a result, parts of layer 18 are spaced from printed circuit substrate 13 at a given distance (an insulating space). As shown in FIGS. 11 and 12, the multidirectional input device of the second embodiment has plane conductive plate 36, which is formed of an anisotropic conductor, between layer 18 and first conductive layer 22 or second conductive layer 23. Layer 18 is spaced from printed circuit substrate 13 at a given distance (an insulating space), so that the resistance element layer shorts with the conductive layer at a pressed point.

Conductive plate 36 is a ring-shaped anisotropic conductor produced from an anisotropic conductive sheet which has metal particles arrayed in a rubber substrate thicknesswise. When the anisotropic conductor is pressed thicknesswise, a resistance in the thickness direction is reduced, whereby an insulating state (not less than 10 MΩ) changes to a conductive state (not more than a few tens of MΩ) rapidly.

An operation of the multidirectional input device is described as follows. As shown in FIG. 12, a given voltage is applied between leads 18A and 18B of resistance element layer 18 of the lower surface of flexible insulating substrate 16. As shown in a sectional view of FIG. 13, when point 29 to be pressed of upper surface 14A of knob 14 is pressed downward, knob 14 tilts to left side with respect to protrusion 14B against the energising force of ring-shaped flat spring 17. Point 29A corresponding to point 29 is a point of a lower surface of ring-shaped protruded section 14D. Point 29A presses the upper surface of substrate 16 and bends it downward partially.

Contact point 30 of the lower surface of layer 18 of bent part of substrate 16 presses conductive plate 36 partially. A resistance in the thickness direction of a pressed part of conductive plate 36 is reduced rapidly, whereby an insulating state changes to a conductive state. Contact point 30 of layer 18 comes in contact with first conductive layer 22 beneath conductive plate 36 for conduction. A DC voltage applied between leads 18A and 18B of resistance element layer 18 is divided proportionally to resistances of both sides of contact point 30, and is supplied to lead 22A of first conductive layer 22. An output signal is supplied to microprocessor 25, and at that time, an output voltage of second conductive layer 23 is not generated, which is the same as that of the first embodiment.

When pressure of the upper surface 14A of knob 14 is removed, knob 14 returns to the substantially original vertical position by energising force of flat spring 17. Contact point 30 of resistance element layer 18 of the lower surface of substrate 16 returns to the original vertical position by resilient force of substrate 16 per se. The upper surface and the lower surface of conductive plate 36 are restored to the insulated state.

Figure 13:
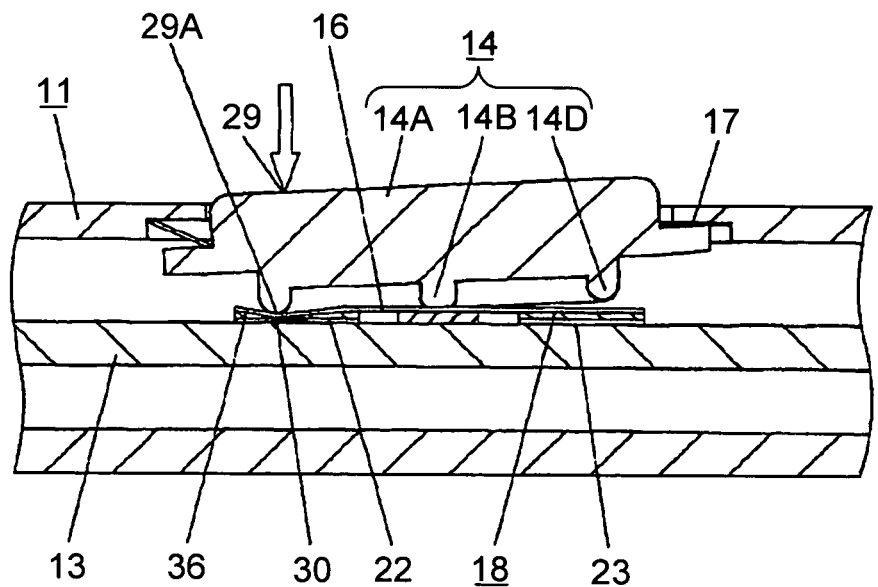
FIG. 13 is a sectional view showing a pressed and tilted knob used in the cellular phone in accordance with the second embodiment of the invention.

One of two kinds of conducting process can be selected using one of two kinds of anisotropic conductors. One process is illustrated in FIG. 13. When conductive plate 36 is pressed and contracted, a resistance is reduced thicknesswise. Another process is described as follows. When conductive plate 36 is pressed and feels stimulation of pressure, a resistance is reduced thicknesswise, but the thickness of conductive plate 36 per se is kept substantially constant.

In this embodiment, a given insulating space between resistance element layer 18 and first conductive layer 22 or second conductive layer 23 is positively obtainable, because conductive plate 36 takes a plane shape. Ring of conductive plate 36, resistance element layer 18, first conductive layer 22 and second conductive layer 23 can be smaller than those in the first embodiment, so that a smaller multidirectional input device can be produced. In addition to that, conventional parts can be used for elements, e.g., printed circuit substrate 13 and top casing 11, thus the electronic apparatus using the multidirectional input device can be downsized. The multidirectional input device of this embodiment can also have two pairs of electrodes on the resistance element layer. In that structure, when knob 14 tilts to neighborhoods of respective leads, resolutions of directions become higher.

Exemplary Embodiment 3

The third exemplary embodiment is described hereinafter with reference to the accompanying drawings.

Figure 14:
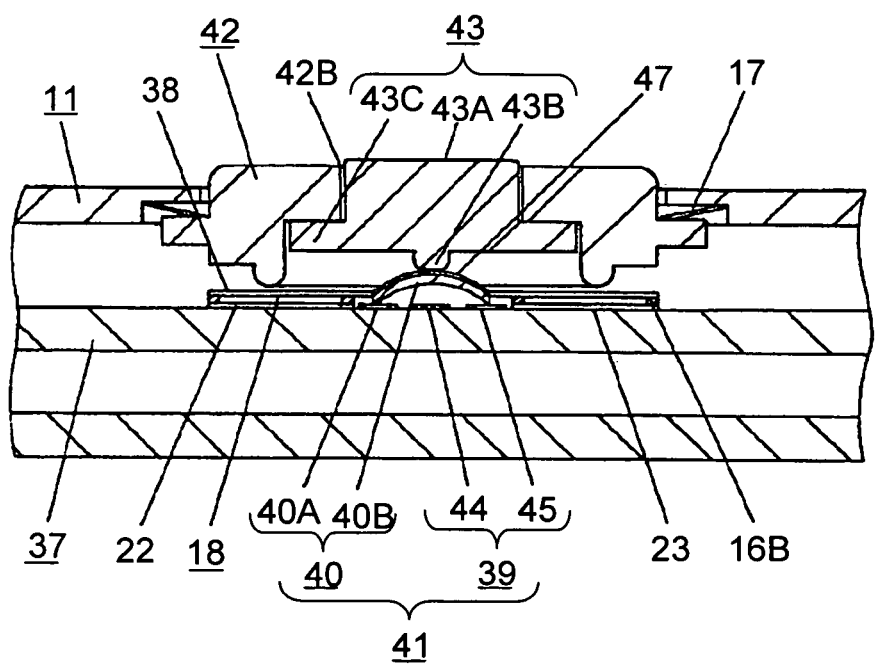
FIG. 14 shows a sectional view of an essential part of a cellular phone as an electronic apparatus using a multidirectional input device in accordance with a third exemplary embodiment of the present invention.
Figure 15:
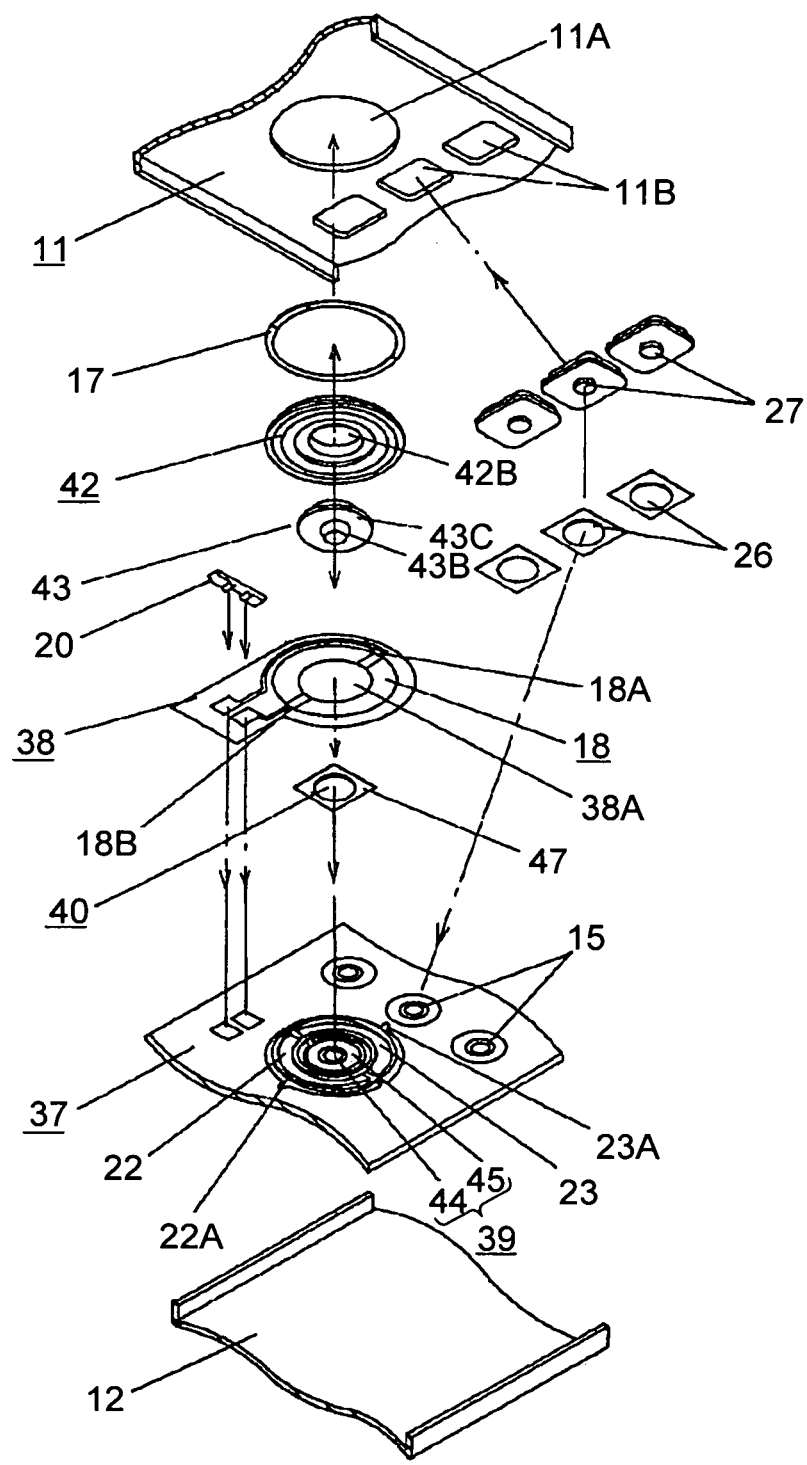
FIG. 15 shows an exploded perspective view of the multidirectional input device used in the cellular phone in accordance with the third embodiment of the invention.

FIG. 14 shows a sectional view of an essential part of a cellular phone as an electronic apparatus using a multidirectional input device in accordance with the third exemplary embodiment of the present invention. FIG. 15 shows an exploded perspective view of the same multidirectional input device used in the cellular phone. As shown in FIG. 14 and FIG. 15, a multidirectional input device of this embodiment has fixed contact 39 on the centers of first conductive layer 22 and second conductive layer 23, and has moving contact 40 on the center of ring-shaped resistance element layer 18. First conductive layer 22 and second conductive layer 23 shaped in arcs are formed on printed circuit substrate 37 having a multi-wiring section. Ring-shaped resistance element layer 18 is formed on a lower surface of flexible insulating substrate 38. Fixed contact 39 and moving contact 40 are electrically independent of each other, and form switch contact 41. Push switch 43 is disposed in through-hole 42B, which is punched at a center of knob 42.

Figure 16:
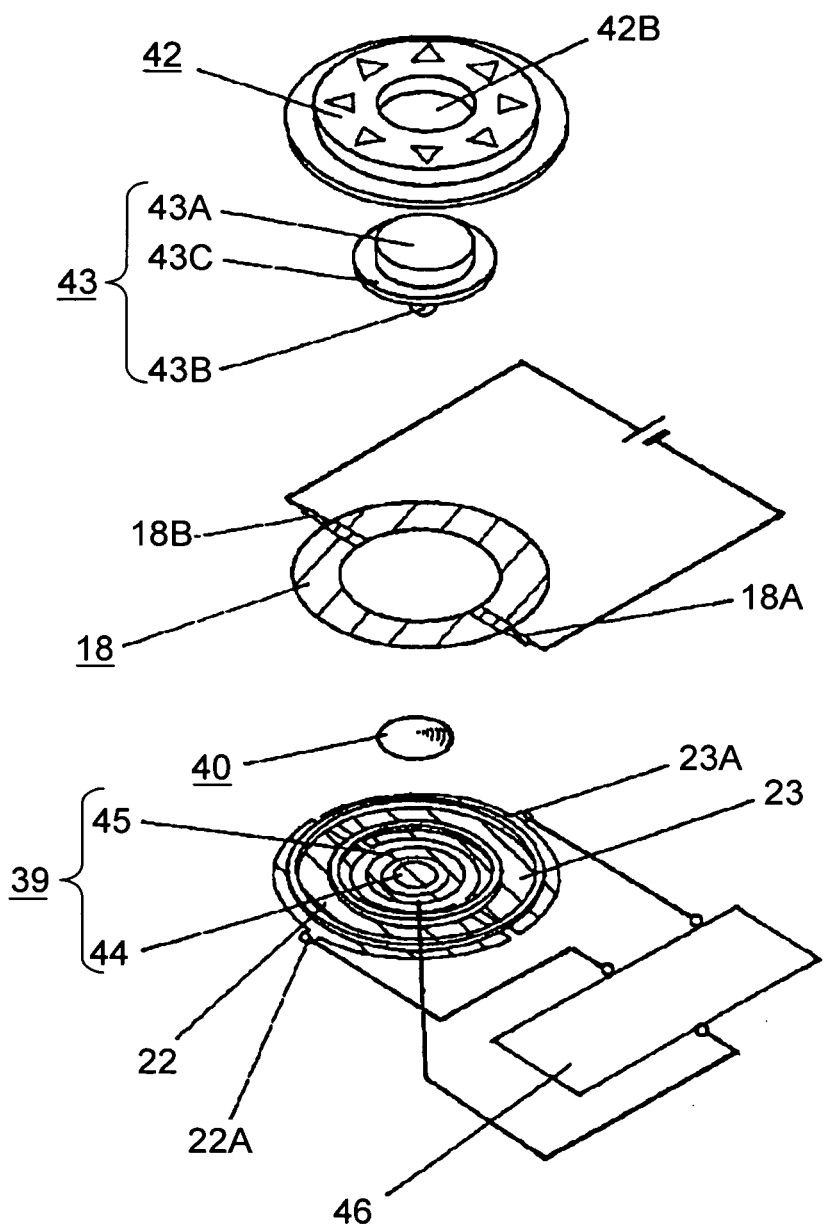
FIG. 16 shows a schematic view illustrating a structure of the multidirectional input device used in the cellular phone in accordance with the third embodiment of the invention.
Figure 17:
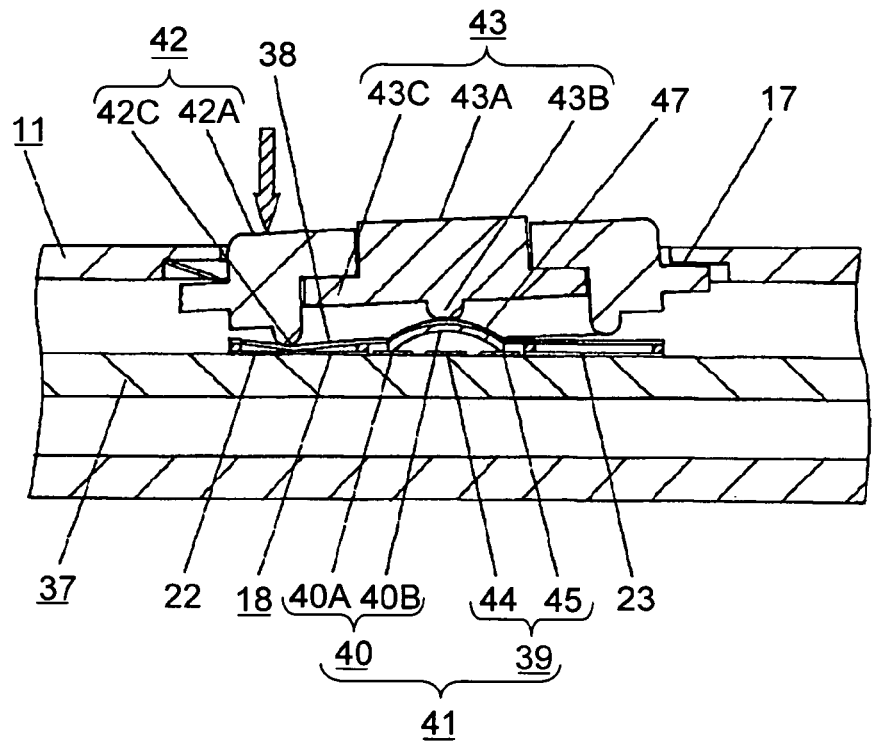
FIG. 17 is a sectional view showing a pressed and tilted knob used in the cellular phone in accordance with the third embodiment of the invention.

As shown in FIG. 15, fixed contact 39 of switch contact 41 is formed of small-circular central contact 44 and ring-shaped outer contact 45. Central contact 44 is formed of a metal leaf pasted on printed circuit substrate 37, or conductive ink printed on substrate 37. Outer contact 45 is formed around the central contact 44. As shown in FIG. 16, fixed contact 39 is connected to microprocessor 46 included in the cellular phone via multi-wiring section (not shown) of printed circuit substrate 37.

Moving contact 40 of switch contact 41 is formed of a thin resilient metal substrate formed into a domed shape. Lower rim section 40A of moving contact 40 is disposed on outer contact 45. A lower surface of central convex section 40B is spaced from central contact 44 at a given distance using flexible adhesive tape 47, whereby moving contact 40 is disposed on printed circuit substrate 37. An upper surface of central convex section 40B is protruded upward from hole 38A which is punched at a center of resistance element layer 18 on flexible insulating substrate 38.

Push switch 43 shapes in multistage-disk made of resin, and is retained by through-hole 42B punched at the center of knob 42, and can move up and down independently of knob 42. An operating section is formed of knob 42 and push switch 43. In an original position, central protrusion 43B of a lower surface of push switch 43 comes in contact with the upper surface of central convex section 40B of moving contact 40 via adhesive tape 47, so that upper surface 43A is protruded from through-hole 42B of knob 42. Since peripheral flange 43C pushes up a lower surface of knob 42 at a given distance, flat spring 17 disposed at a rim of knob 42 is bent slightly, and knob 42 is thus retained substantially vertical to substrate 37 steady.

An operation of the multidirectional input device is described as follows.

FIG. 16 shows a schematic view of the multidirectional input device in accordance with this embodiment. A given voltage is applied between leads 18A and 18B of resistance element layer 18 of the lower surface of flexible insulating substrate 38. As shown in a sectional view of FIG. 17, when one point of upper surface 42A of knob 42 is pressed downward, knob 42 tilts to a pressed side with respect to central protrusion 43B of a lower surface of push switch 43 retained by through-hole 42B. Protruded section 42C from a lower surface of knob 42 presses the upper surface of substrate 38 and bends it downward partially, whereby resistance element layer 18 of the lower surface of substrate 38 comes in contact with first conductive layer 22 or second conductive layer 23 for conduction.

As a result, an output voltage, which is determined by a resistance value between electrode 18C of resistance element layer 18 and the contacted point, is supplied from lead 22A of first conductive layer 22 or lead 23A of second conductive layer 23, and input to microprocessor 46.

When pressure of the upper surface 42A of knob 42 is removed, knob 42 returns to the substantially original vertical position (the original position illustrated in FIG. 14) by energising force of flat spring 17. Resistance element layer 18 of the lower surface of substrate 38 is separated from first conductive layer 22 or second conductive layer 23 by resilient force of substrate 38 itself.

When knob 42 tilts, protrusion 43B works as a fulcrum, and only flat spring 17 disposed at a rim of knob 42 is bent, so that the push switch is not operated. Protrusion 43B of the lower surface of push switch 43 comes in contact with the upper surface of central convex section 40B of domed moving contact 40.

Figure 18:
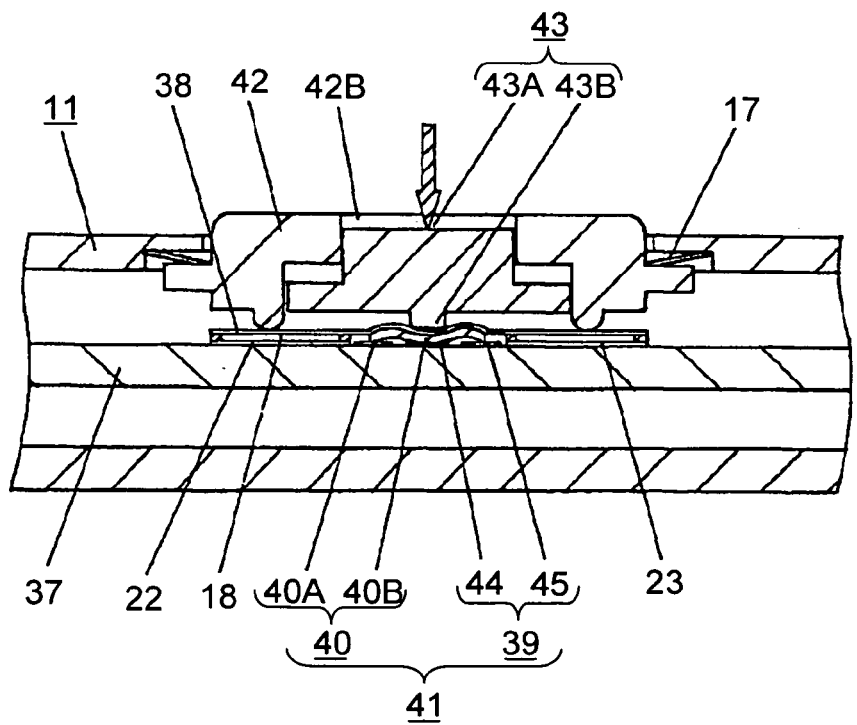
FIG. 18 is a sectional view showing a pressed switch used in the cellular phone in accordance with the third embodiment of the invention.

A voltage supplied to microprocessor 46 is calculated by microprocessor 46, so that a tilt direction of knob 42 is recognized. If the recognized direction is a desirable direction, it is stored in microprocessor 46, and upper surface 43A of push switch 43 at the center of knob 42 is pressed. FIG. 18 is a sectional view showing the state discussed above. When protrusion 43B of the lower surface of push switch 43 pushes central convex section 40B of domed moving contact 40 downward, moving contact 40 bows downward resiliently with click-feeling, and a lower surface of central convex section 40B comes in contact with central contact 44. As a result, outer contact 45 of switch contact 41 shorts with central contact 44, and a signal is supplied to microprocessor 46, then finally the direction stored is thus determined.

When pressure of push switch 43 is removed, moving contact 40 returns to the original domed shape (the original state illustrated in FIG. 14) by resilient force of contact 40 itself, and switch contact 41 also returns to the original OFF state. Since push switch 43 is operated independent of knob 42, knob 42 moves downward slightly, but does not push flexible insulating substrate 38.

In this embodiment, the multidirectional input device including the push switch section with click-feeling, which can supply another signal in addition to the recognized signal of tilted knob 42, is obtainable without increasing its size. The another signal is supplied by pressing push switch 43. Conventional parts can be used for elements, e.g., printed circuit substrate 13 and top casing 11.

Exemplary Embodiment 4

The fourth exemplary embodiment is described hereinafter with reference to the accompanying drawings.

Figure 19:
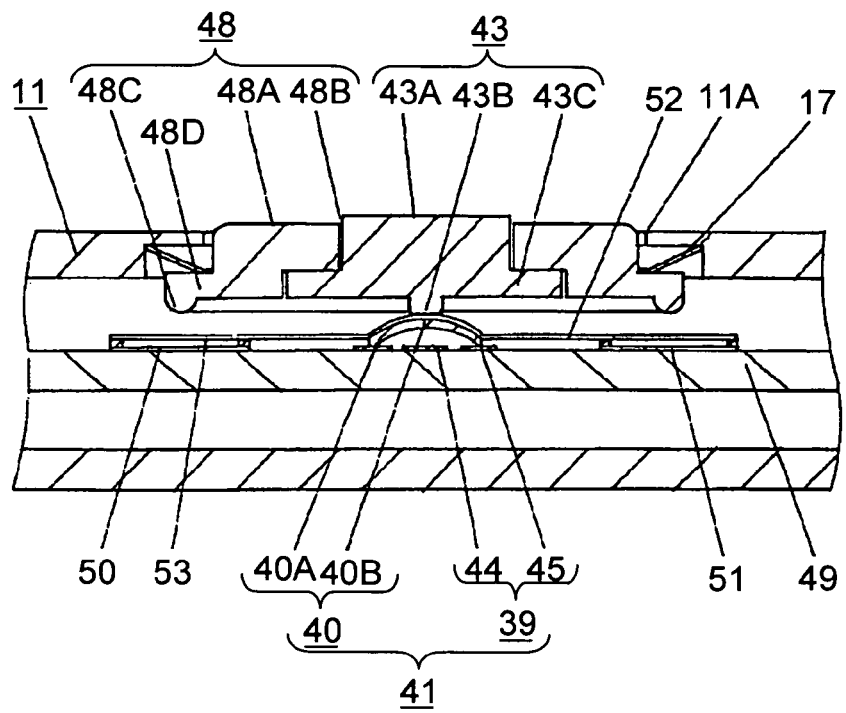
FIG. 19 shows a sectional view of an essential part of a cellular phone as an electronic apparatus using a multidirectional input device in accordance with a fourth exemplary embodiment of the present invention.

FIG. 19 shows a sectional view of an essential part of a cellular phone as an electronic apparatus using a multidirectional input device in accordance with the fourth exemplary embodiment of the present invention.

As shown in FIG. 19, a multidirectional input device of the fourth embodiment is different from that of the third embodiment. Section 48A to be pressed of an upper surface of ring-shaped knob 48 is formed inside ring-shaped protruded section 48C beneath knob 48. Push switch 43 is retained in through-hole 48B of a center of knob 48 with slight concentric clearance. The other structure is the same as that of the third embodiment. As shown in FIG. 19, knob 48 is retained in through-hole 11A of top casing 11 via ring-shaped flat spring 17. Protruded section 48C is formed on a lower rim surface of flange 48D which is a maximum diameter section of knob 48. Section 48A is placed rather inside from protruded section 48C.

Fixed contact 39 is formed on a center of first conductive layer 50 or second conductive layer 51, and moving contact 40 is formed on a center of ring-shaped resistance element layer 53. First conductive layer 50 and second conductive layer 51 shaped in arcs are formed on printed circuit substrate 49 having a multi-wiring section. Ring-shaped resistance element layer 53 is formed on a lower surface of flexible insulating substrate 52. Fixed contact 39 and moving contact 40 are electrically independent of each other, and form switch contact 41. Push switch 43 for operation is disposed in through-hole 48B, which is punched at a center of knob 48. This is the same structure as that of the third embodiment. Diameters of resistance element layer 53, first conductive layer 50 and second conductive layer 51 of printed circuit substrate 49 correspond to those of protruded section 48C of the lower surface of knob 48.

Push switch 43 can move up and down independently of knob 48. At an original position, central protrusion 43B of lower surface of knob 43 comes in contact with the upper surface of central convex section 40B of moving contact 40, so that the upper surface 43A is protruded from through-hole 48B. Since peripheral flange 43C pushes up a lower surface of knob 48 at a given distance, flat spring 17 disposed at a rim of knob 48 is bent slightly, and knob 48 is thus retained substantially vertical to substrate 49 steady.

An operation of the multidirectional input device is described as follows.

Figure 20:
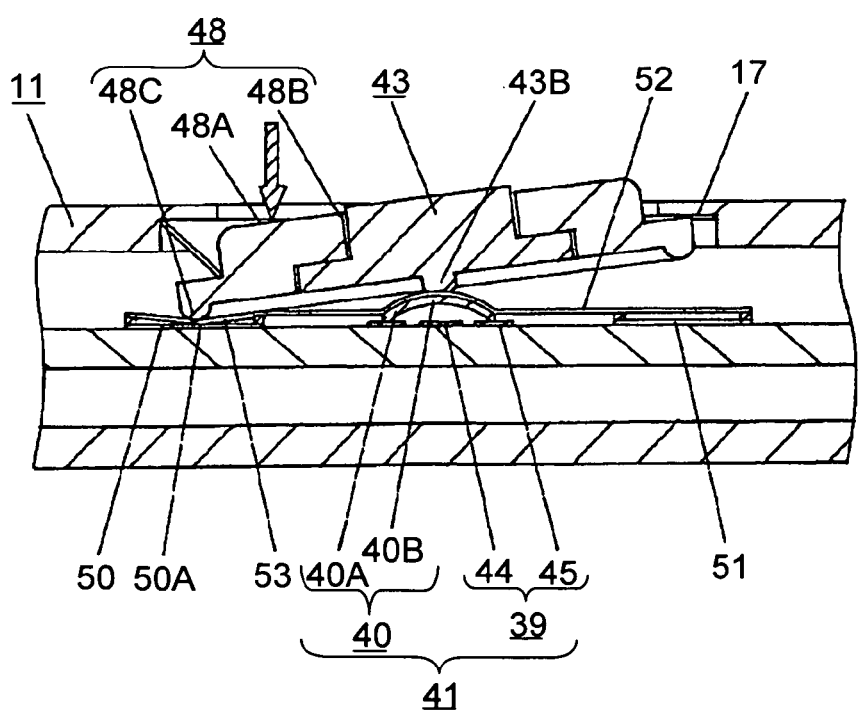
FIG. 20 is a sectional view showing a pressed and tilted knob used in the cellular phone in accordance with the fourth embodiment of the invention.

A given voltage is applied between two electrodes (not shown) of resistance element layer 53 of a lower surface of flexible insulating substrate 52. As shown in FIG. 19, when section 48A of the upper surface of knob 48 is pressed downward, knob 48 tilts to left side with respect to central protrusion 43B of lower surface of push switch 43. FIG. 20 is a sectional view showing this state. Protruded section 48C of the lower surface of knob 48 presses the upper surface of substrate 52 and bends it downward partially. As a result, resistance element layer 53 of lower surface of substrate 52 comes in contact with first conductive layer 50 or second conductive layer 51 for conduction. An output voltage, which is determined by a resistance value between contact point 53A and an electrode (not shown) of resistance element layer 53, is input to a microprocessor (not shown) via a lead (not shown) of first conductive layer 50 or that of second conductive layer 51. An output voltage is calculated by the microprocessor, and a tilt direction of knob 48 is recognized temporarily.

Figure 21:
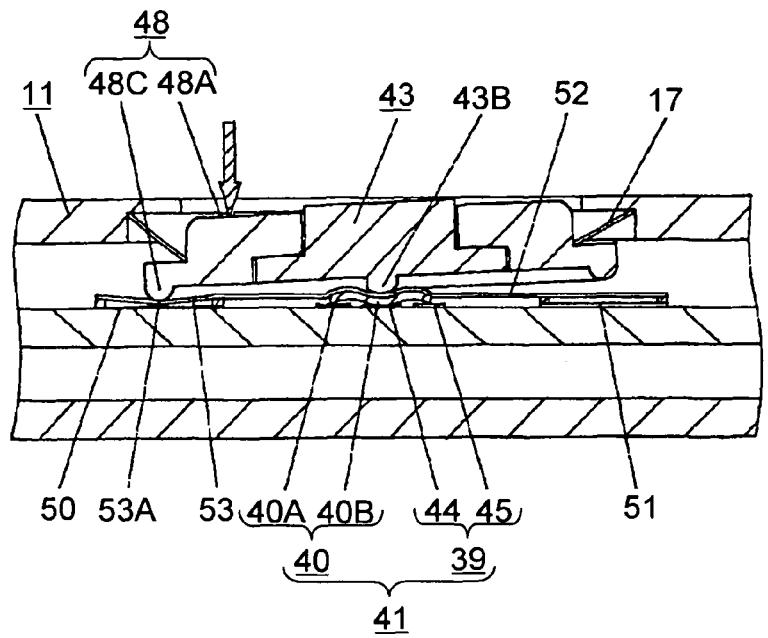
FIG. 21 is a sectional view showing a further pressed and tilted knob used in the cellular phone in accordance with the fourth embodiment of the invention.

As shown in a sectional view of FIG. 21, when knob 48 is pushed downward further, knob 48 tilts to a right side, where a point of protruded section 48C on contact point 53A works as a fulcrum. Push switch 43 retained in central through-hole 48B moves downward. When central protrusion 43B pushes central convex section 40B downward, moving contact 40 bows downward resiliently with click-feeling, and a lower surface of central convex section 40B comes in contact with central contact 44. Protrusion 43B is formed on the lower surface of push switch 43. Convex section 40B is a central position of domed moving contact 40 of switch contact 41.

As a result, outer contact 45 of switch contact 41 shorts with central contact 44, and a signal is supplied to the microprocessor, then finally the direction stored temporarily is recognized. The tilt direction of knob 48 is recognized by the microprocessor. Since push switch 43 is retained in through-hole 48B of the center of knob 48 with slight concentric clearance, the push switch is operated exactly with click-feeling independent of the tilt direction of knob 48.

When pressure of section 48A of knob 48 is removed, moving contact 40 returns to the original domed shape by resilient force of contact 40 itself. Switch contact 41 returns to an OFF state, and knob 48 returns to the substantially original vertical position by energising force of flat spring 17. Resistance element layer 53 of the lower surface of flexible insulating substrate 52 is separated from first conductive layer 50 or second conductive layer 51 by resilient force of substrate 52 itself. The multidirectional input device returns to the original state of FIG. 19.

Figure 22:
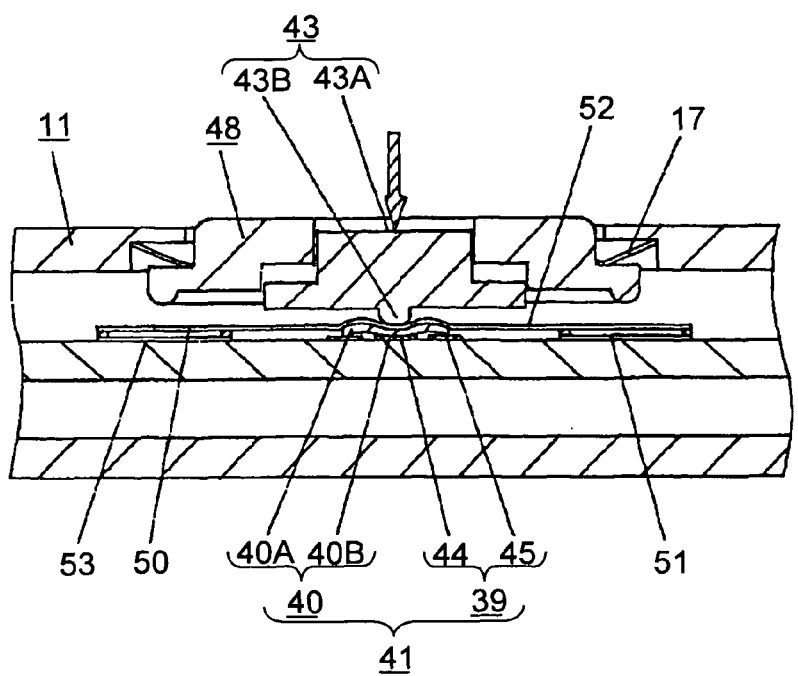
FIG. 22 is a sectional view showing a pressed switch used in the cellular phone in accordance with the fourth embodiment of the invention.

If the direction recognized by the microprocessor is a desirable direction, the direction is stored in the microprocessor, and upper surface 43A of push switch 43 at the center of knob 48 is pressed. FIG. 22 is a sectional view showing the state discussed above. When protrusion 43B of the lower surface of push switch 43 pushes central convex section 40B of domed moving contact 40 downward, moving contact 40 bows downward resiliently with click-feeling, and a lower surface of central convex section 40B comes in contact with central contact 44. As a result, outer contact 45 of switch contact 41 shorts with central contact 44, and a signal is supplied to the microprocessor, then the stored direction discussed above is thus determined as the desirable direction.

Since push switch 43 is operated independent of knob 48, knob 48 moves downward slightly, but does not push flexible insulating substrate 52.

Exemplary Embodiment 5

The fifth exemplary embodiment is described hereinafter with reference to the accompanying drawings.

Figure 23:
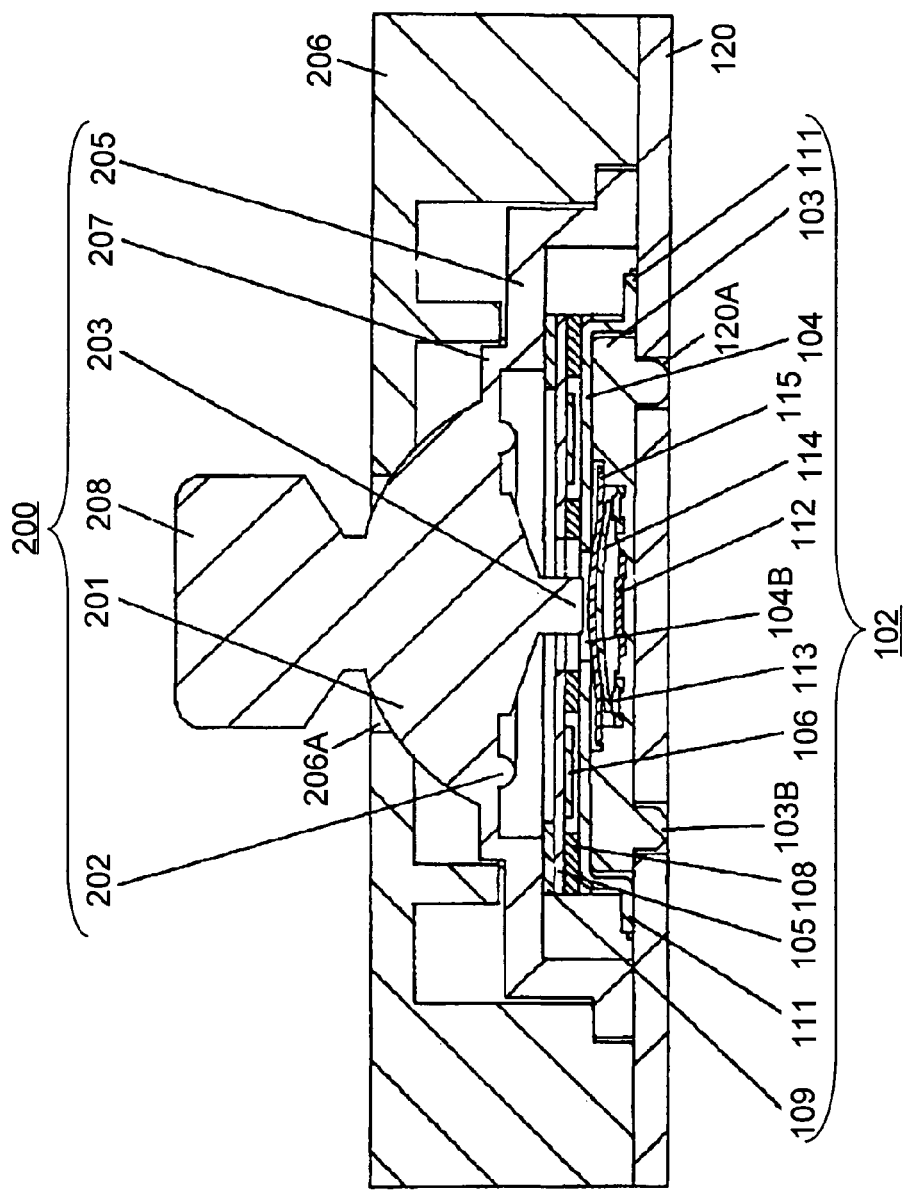
FIG. 23 shows a sectional view of an essential part of an electronic apparatus including a multidirectional input device in accordance with a fifth exemplary embodiment of the present invention.
Figure 24:
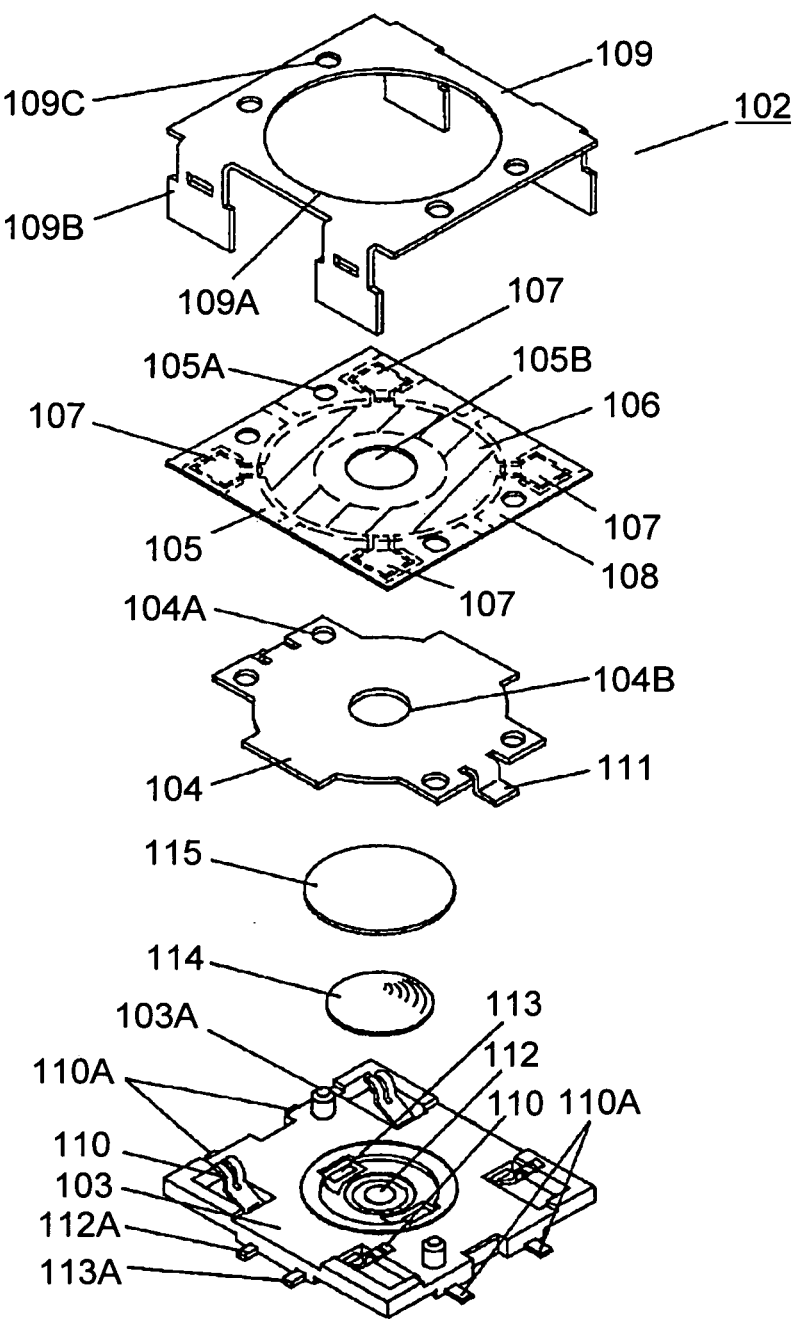
FIG. 24 shows an exploded perspective view of the multidirectional input device used in the electronic apparatus in accordance with the fifth embodiment of the invention.
Figure 25:
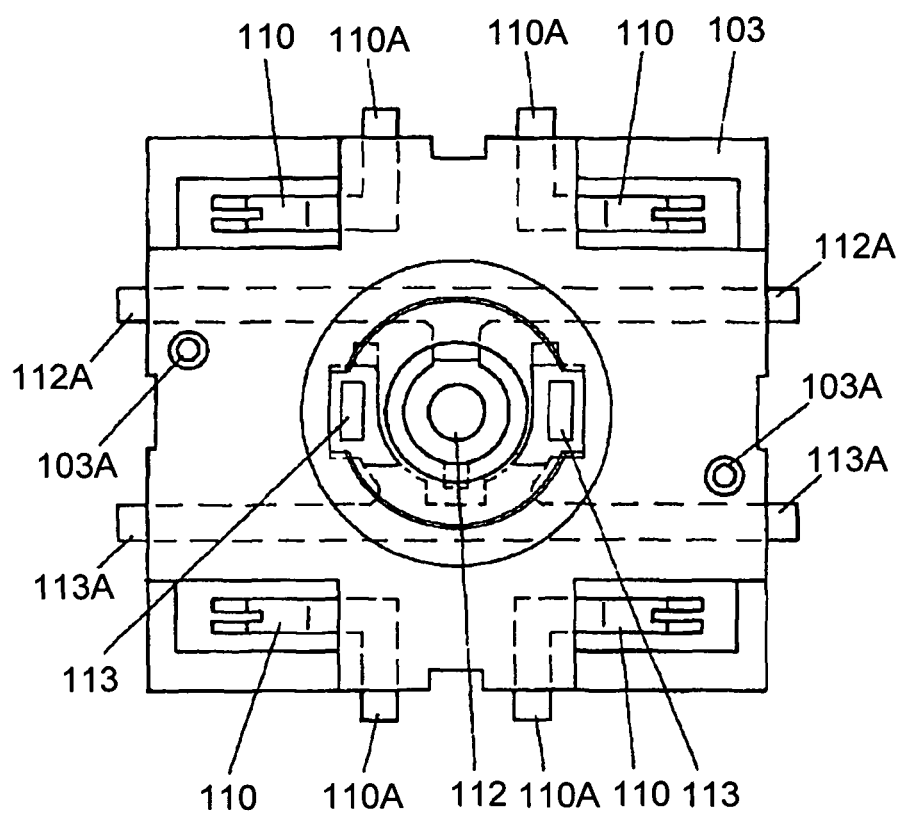
FIG. 25 shows a top view of a component casing containing the multidirectional input device as a main part of the electronic apparatus in accordance with the fifth embodiment of the invention.

FIG. 23 shows a sectional view of an essential part of an electronic apparatus including a multidirectional input device in accordance with the fifth exemplary embodiment of the present invention. FIG. 24 shows an exploded perspective view of the same multidirectional input device used in the electronic apparatus.

As shown in FIG. 23 and FIG. 24, the multidirectional input device of the fifth embodiment is formed of operating section 200 and individual solderable electronic components 102.

Electronic component 102 for inputting multi directions is formed of casing 103 housing electronic components and plane substrate 104 disposed on casing 103. Casing 103 is made of insulated resin, and plane substrate 104 is made of plane conductive metal substrate. Flexible insulating substrate 105 is disposed above plane substrate 104 at a given space. Ring-shaped resistance element layer 106 and terminal 107 are formed on a lower surface of insulating substrate 105. Terminal 107 is formed radially from layer 106 to the perimeter of substrate 105 at 90° intervals. Insulating spacer 108 is formed on the lower surface of insulating substrate 105 except for layer 106 and terminal 107.

Resistance element layer 106 has an uniform surface resistance, and a ring-width of layer 106 is uniform. As shown in FIG. 24, layer 106 of the lower surface of insulating substrate 105 is hatched for easy identifying. Substrate 104 is spaced from layer 106 of substrate 105 by insulating spacer 108 at a given distance.

Metal cover 109 having aperture 109A covers insulating substrate 105, plane substrate 104 and casing 103. Aperture 109A is slightly lager than an outer diameter of resistance element layer 106, and corresponds to layer 106. A fixing leg of metal cover 109 is caulked at the bottom of casing 103. Positioning protrusion 103A protruding upward is disposed on casing 103, and extends coaxially through positioning holes 104A, 105A and 109C, which are punched on plane substrate 104, insulating substrate 105 and metal cover 109 respectively.

Respective terminals 107 of resistance element layer 106 positioned on casing 103 are fixed to casing 103, and come in contact with resilient legs 110 protruded upward with a given pressure. As shown in a top view of the casing of FIG. 25, resilient legs 110 are fixed at four corners of rectangular casing 103. Respective ends of resilient legs 110 are routed from casing 103 to the outside, and these routed sections form input terminals 110A. Output terminal 111 is incorporated in plane substrate 104. Output terminal 111 is routed from casing 103 to the outside and is placed on the same plane as input terminal 110A. Corners of plane substrate 104 corresponding to resilient legs 110 have been cut away, so that plane substrate 104 should not come in contact with resilient legs 110.

Central contact 112 and outer contact 113, which are used for switching, are fixed on a center of casing 103. Switching terminal 112A of central contact 112 and switching terminal 113A of outer contact 113 are also routed from casing 103 to the outside, and are placed on the same plane as input terminal 110A. Domed moving contact 114 formed of a thin resilient metal substrate is disposed on outer contact 113. An upper surface of moving contact 114 and an upper surface of casing 103 are rigidly bonded with adhesive tape 115. As a result, moving contact 114 is fixed on casing 103, and electrically insulated from plane substrate 104. A lower surface of a center of moving contact 114 is spaced from central contact 112 at a given distance.

A diameter of moving contact 114 is smaller than an inner diameter of a circle of resistance element layer 106, and moving contact 114 is placed coaxially in the circle of layer 106. Aperture 104B for pressing is punched on plane substrate 104, and aperture 105B for pressing is punched on insulating substrate 105, where apertures 104B and 105B correspond to the center of moving contact 114.

Electronic component 102 for inputting multi directions is formed as discussed above. The multidirectional input device including electronic component 102 is described hereinafter with reference to FIG. 23. As shown in FIG. 23, boss 103B at the bottom of case 103 is inserted in through-hole 120A of printed circuit substrate 120, so that electronic component 102 is positioned. Respective terminals 111A, 111, 112A and 113A (FIG. 23 shows only output terminal 111) are fixed at a given position of printed circuit substrate 120 by soldering. Operating section 200, which can move vertically and tilt, is disposed on electronic component 102. Operating section 200 includes ring-shaped protrusion 202 and central convex section 203. Protrusion 202 is formed on a lower surface of hemisphere section 201. Central convex section 203 is formed on the center of protrusion 202, and higher than protrusion 202.

Outer section 205 of operating section 200 is covered with covering-material 206 (top casing), then ring-shaped protrusion 202 is disposed above resistance element layer 106 of electronic component 102, and central convex section 203 is disposed above a center of moving contact 114 of electronic component 102.

Outer section 205 of operating section 200 and hemisphere section 201 are coupled via flared resilient section 207 which is spread toward every lower direction. Ring-shaped protrusion 202 is spaced from insulating substrate 105 at a given distance by resilient section 207, and central convex section 203 is spaced from adhesive tape 115 on moving contact 114.

Control knob 208 is formed on a central upper side of hemisphere section 201, and protruded from aperture 206A punched on covering-material 206. As shown in an original state of FIG. 23, a lower section of aperture 206A is shaped in a hemisphere corresponding to hemisphere section 201, and pushed up by working of resilient section 207 when control knob 208 is not operated. Since an upper section of hemisphere section 201 is connected to the lower section of aperture 206A, operating section 200 keeps a neutral position.

Figure 26:
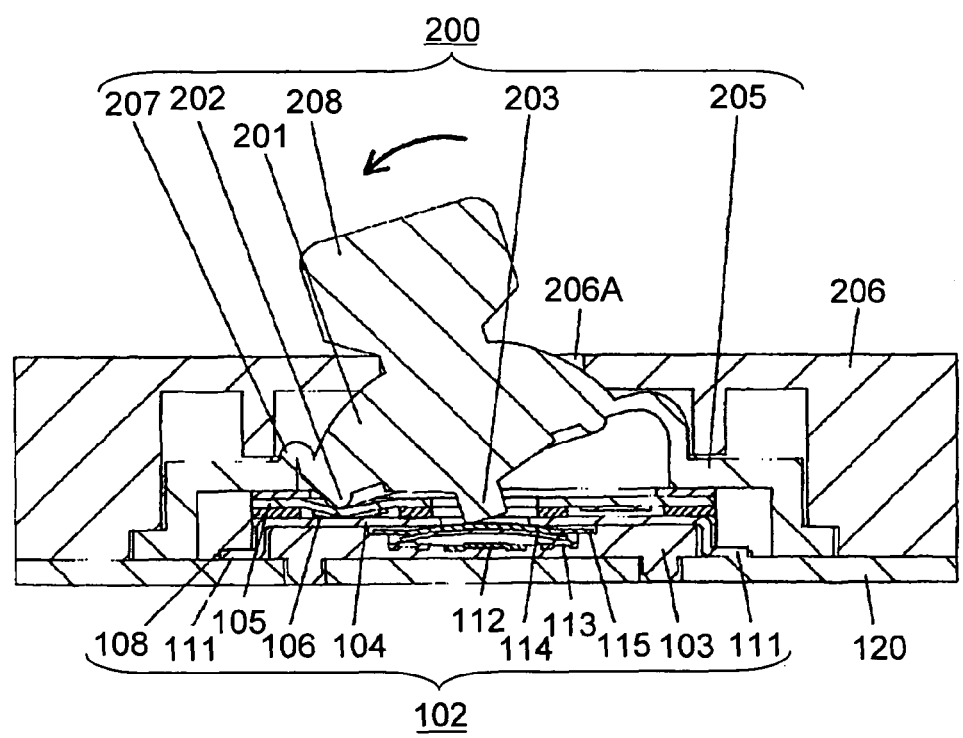
FIG. 26 is a sectional view showing a tilted operating section used in the electronic apparatus in accordance with the fifth embodiment of the invention.
Figure 27:
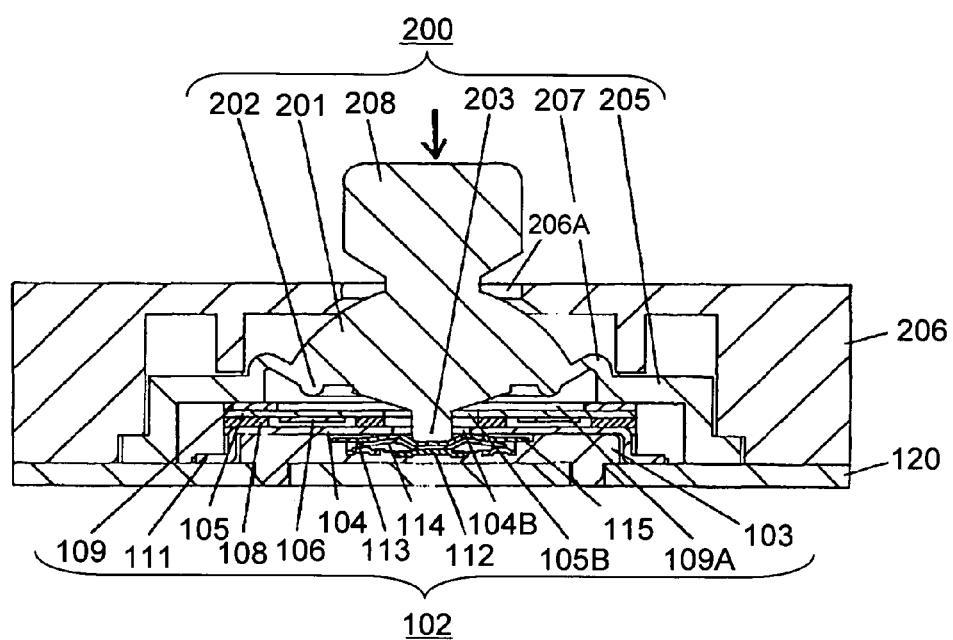
FIG. 27 is a sectional view showing a pressed operating section used in the electronic apparatus in accordance with the fifth embodiment of the invention.

The multidirectional input device of this embodiment is formed as mentioned above. An operation of the multidirectional input device is described as follows. When force, which tilts knob 208 to the left, is applied to knob 208, left resilient section 207 is bent, and hemisphere section 201 of operating section 200 slantingly rotates along the lower section of aperture 206A. When operating section 200 rotates at a given angle, ring-shaped protrusion 202 moves downward and comes in contact with the surface of insulating substrate 105. As shown in FIG. 26, protrusion 202 pushes insulating substrate 105 downward, and resistance element layer 106 comes in contact with plane substrate 104.

A given voltage is applied between two input terminals 110A of electronic component 102, and the voltage is thus applied to resistance element layer 106 via two terminals 107 and two resilient legs 110 connected to two input terminals 110A.

Since resilient legs 110 come in contact with terminals 107 resiliently with a given pressure, the voltage is applied positively to resistance element layer 106 with little power loss. The first output voltage value is detected from output terminal 111 of plane substrate 104 in this condition. The first output voltage value is calculated by a microprocessor, so that two contacted sections between resistance element layer 106 and plane substrate 104 are recognized.

The voltage applied between two input terminals 110A is stopped and then the given voltage is applied to resistance element layer 106 via other two input terminals 110A, which are different from the terminals 110A discussed above, in a short cycle using the microprocessor. The second output voltage value is detected from output terminal 111. The second output voltage value is calculated by the microprocessor, so that two contacted sections between resistance element layer 106 and plane substrate 104 are recognized. The positions recognized by the first output voltage value and the second output voltage value are compared by the microprocessor. An agreed position out of compared position is determined as a position contacted between layer 106 and substrate 104, so that the direction input through control knob 208 is determined. The electronic apparatus is controlled based on the direction determined.

When the force applied to control knob 208 is removed, left resilient section 207, which is bent as shown in FIG. 26, returns to the original shape. Operating section 200 returns to the neutral position shown FIG. 23 by restoring force of resilient section 207. In this embodiment, operating section 200 is tilted to left as mentioned, however, the same working is obtainable when operating section 200 is tilted to another direction, because resistance element layer 106 is shaped in a ring. As a result, a tilt direction in any angle (360°) can be detected.

Resolution of the first output voltage value and the second output voltage value for determining the contact point is changeable, whereby a resolution of the tilt direction is changeable. When control knob 208 tilts, moving contact 114 receives the force from central convex section 203 of operating section 200, but contact 114 is made of material which is not deformed by the force, so that a switch is kept remained.

When force pushing downward is applied to control knob 208, hemisphere section 201 moves downward, and flared resilient section 207 bows every direction. A tip of section 203 of a lower section of section 201 comes in contact with an upper surface of adhesive tape 115 and pushes moving contact 114 downward. When the force exceeds given force, moving contact 114 bows downward with click-feeling. As shown in a sectional view of FIG. 27, the lower surface of moving contact 114 comes in contact with central contact 112. Central contact 112 conducts to outer contact 113 electrically, namely, switching terminal 112A conducts to switching terminal 113A electrically (not shown).

When the force applied to control knob 208 is removed, moving contact 114 and flared resilient section 207 return to the original shape. Operating section 200 returns to the neutral position of FIG. 23 by restoring force of contact 114 and resilient section 207. When force pushing downward is applied to control knob 208, protrusion 202 of operating section 200 does not come in contact with insulating substrate 105. The multidirectional input device and the electronic apparatus including the multidirectional input device of this embodiment can detect a tilt directions in any angle (360°) at a high resolution, and a switching condition is changeable by pushing the operating section downward.

The electronic apparatus including the multidirectional input device can be controlled using a tilt direction of operating section 200. For example, a cursor displayed on a display area can be moved every direction easily and arbitrarily using this multidirectional input device, so that the electronic apparatus simply operable can be achieved. The electronic apparatus becomes more convenient using the switch signal as a determining signal obtained by pushing operating section 200.

When section 200 is tilted in one direction for more than a given time, or tilted frequently in one direction for a given time, a controlling condition is changeable by clocking a time while section 200 is kept tilting. For example, a moving speed of a cursor or an icon displayed on a display area is changeable. The operation mentioned above can be executed easily with one hand, so that the electronic apparatus becomes more convenient The voltage applied to resistance element layer 106 of the multidirectional input device in this embodiment is changed in a given cycle at high speed. Then the clocking time is desirably synchronized with the changing timing of the applied voltage and preferably prepared for an integral multiple of the changing cycle.

The multidirectional input device, which detect a tilt angle and a pushing condition is formed of electronic component 102, so that that the device can be smaller and thinner. The multidirectional input device of this embodiment is easy to be operated, and can be mounted together with other components on printed circuit substrate 120. Electronic component 102 discussed above has the switch, but the structure without the switch can be also used.

Exemplary Embodiment 6

The sixth exemplary embodiment is described hereinafter with reference to the accompanying drawings.

Figure 28:
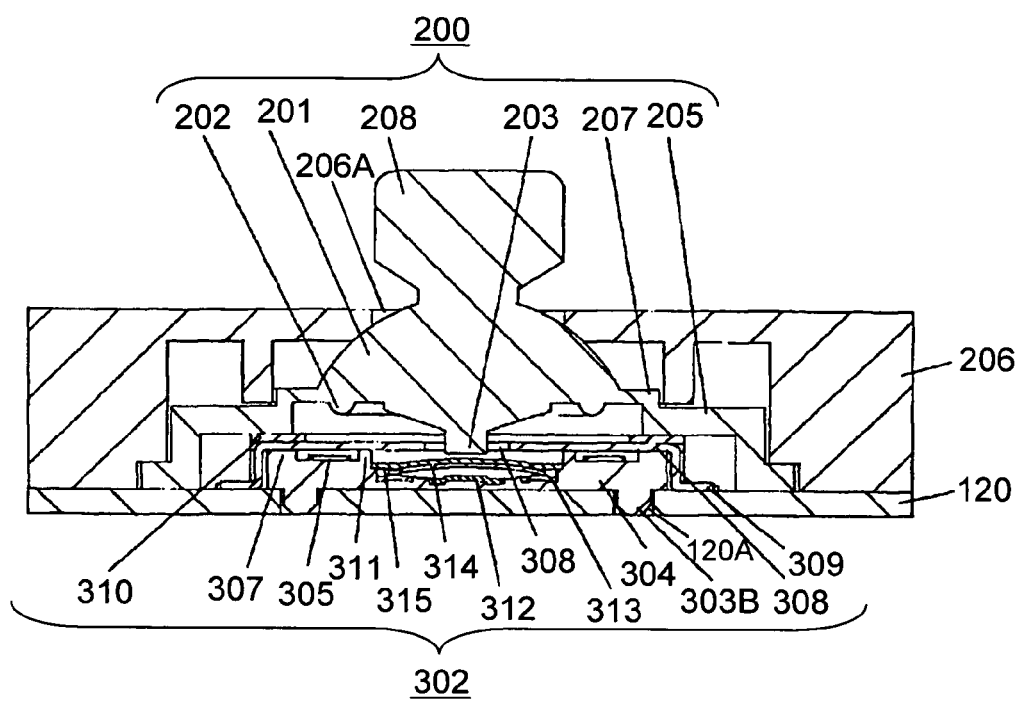
FIG. 28 shows a sectional view of an essential part of an electronic apparatus including a multidirectional input device in accordance with a sixth exemplary embodiment of the present invention.
Figure 29:
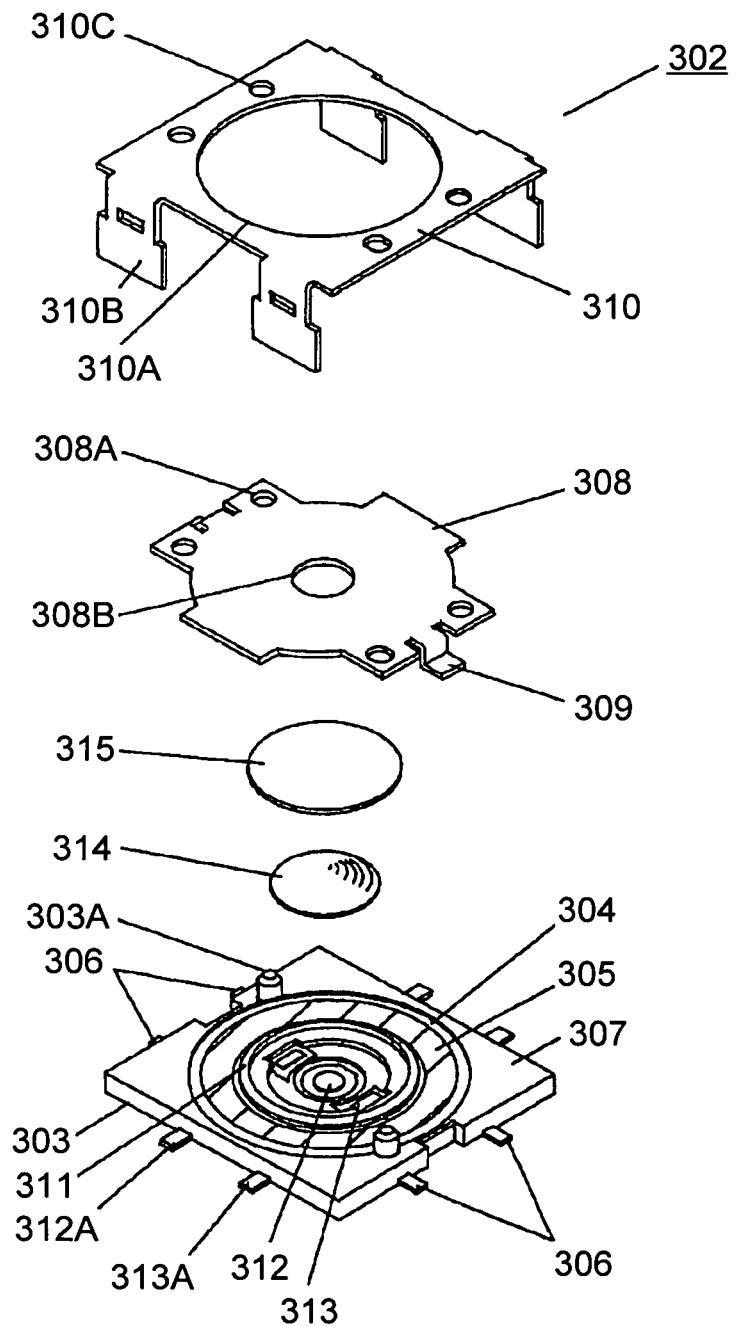
FIG. 29 shows an exploded perspective view of the multidirectional input device used in the electronic apparatus in accordance with the sixth embodiment of the invention.

FIG. 28 shows a sectional view of an essential part of an electronic apparatus including a multidirectional input device in accordance with the sixth exemplary embodiment of the present invention. FIG. 29 shows an exploded perspective view of the same multidirectional input device.

As shown in FIG. 28 and FIG. 29, the multidirectional input device of the sixth embodiment is formed of operating section 200 and individual electronic components 102 as same as the fifth embodiment. In these drawings, the similar elements of the fifth embodiment have the similar reference marks, and the descriptions thereof are omitted here.

Insulating substrate 304 is fixed on casing 303 made of insulated resin. Ring-shaped resistance element layer 305 is formed on an upper surface of insulating substrate 304. Layer 305 has an uniform surface resistance, and a ring-width of layer 305 is uniform. As shown in FIG. 29, layer 305 is hatched for easy identifying. A terminal (not shown) is formed radially from layer 305 to the perimeter of substrate 304 at 90° intervals, and input terminal 306 connected to the terminal is routed from a side of casing 303 to the outside.

Plane circumference section 307, which is higher than layer 305, is formed on an upper surface of casing 303, and spaced outside from layer 305 slightly. Plane substrate 308 made of resilient conductive metal substrate is disposed on section 307. Plane substrate 308 is spaced from resistance element layer 305 at a given distance by plane circumference section 307. Output terminal 309 is incorporated in plane substrate 308. Output terminal 309 is routed from casing 303 to the outside, and is placed on the same plane as input terminal 306.

Aperture 310A for operation, which is slightly larger than an outer diameter of layer 305, is punched on metal cover 310. When aperture 310A corresponds to layer 305, metal cover 310 covers plane substrate 308 and casing 303. A fixing leg 310A of metal cover 310 is caulked at the bottom of casing 303, so that plane substrate 308 and casing 303 are combined. Positioning protrusion 303A protruded upward from casing 303 extends coaxially through positioning holes 308A and 310C, which are punched on plane substrate 308 and metal cover 310 respectively.

Ring-shaped internal-section 311 is formed on a center of casing 303 and formed inside resistance element layer 305. Central contact 312 and outer contact 313 are fixed inside internal-section 311. Switching terminal 312A of central contact 312 and switching terminal 313A of outer contact 313 are routed from casing 303 to the outside, and placed on the same plane as other terminals.

Domed moving contact 314 formed of a thin metal substrate is disposed on outer contact 313. An upper surface of moving contact 314 and an upper surface of casing 303 are rigidly bonded with adhesive tape 315. As a result, moving contact 314 is fixed on casing 303, and electrically insulated from plane substrate 308. A lower surface of a center of moving contact 314 is spaced from central contact 312 at a given distance.

Internal-section 311 is placed on the same plane as plane circumference section 307 on casing 303. An upper surface of adhesive tape 315 is lower than section 311 or section 307, when moving contact 314 is rigidly bonded. Aperture 308B for pressing is punched on plane substrate 308, where apertures 308B corresponds to the center of moving contact 314.

Electronic component 302 for inputting multi directions is described hereinafter with reference to FIG. 28. Boss 303B at the bottom of case 303 is inserted in through-hole 120A of printed circuit substrate 120, so that electronic component 302 is positioned. Respective terminals 306, 309, 312A and 313A (FIG. 28 shows only output terminal 309) are fixed at a given position of printed circuit substrate 120 by soldering. Operating section 200, which can move vertically and tilt, is disposed above electronic component 302. Operating section 200 is the same as that of the fifth embodiment.

Figure 30:
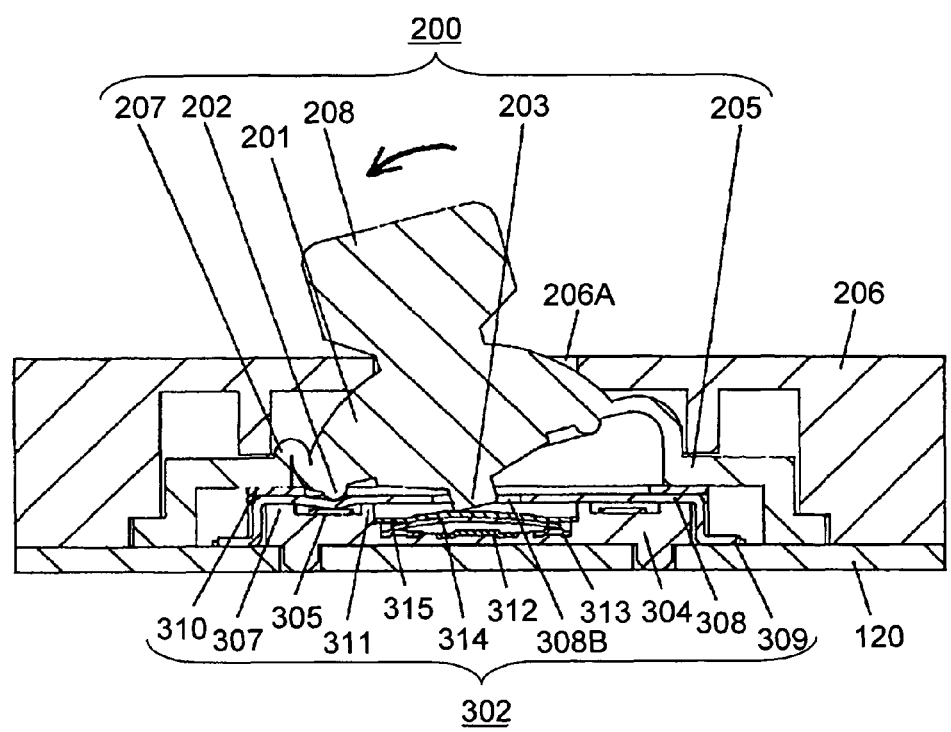
FIG. 30 is a sectional view showing a tilted operating section used in the electronic apparatus in accordance with the sixth embodiment of the invention.

An operation of the multidirectional input device is described as follows. When force, which tilts knob 208 to the left, is applied to knob 208, left resilient section 207 is bent, and hemisphere section 201 slantingly rotates. Ring-shaped protrusion 202 moves downward, and pushes plane substrate 308 downward. As shown in FIG. 30, the lower surface of plane substrate 308 comes in contact with resistance element layer 305. In this condition, a given voltage is applied between two of input terminals 306 of electronic component 302, so that an output voltage value supplied from the contact point of resistance element layer 305 is obtainable from output terminal 309 of plane substrate 308.

A first voltage output from the contact point is calculated by a microprocessor, so that two contacted sections between resistance element layer 305 and plane substrate 308 are recognized. The voltage applied between two input terminals 306 is stopped and then the given voltage is applied to resistance element layer 305 via other two input terminals 306, which are different from the terminals 306 discussed above, in a short cycle using the microprocessor. The second output voltage value is detected from output terminal 309, and calculated by the microprocessor, so that two contacted sections between resistance element layer 305 and plane substrate 308 are recognized.

The positions recognized by the first output voltage value and the second output voltage value are compared by the microprocessor. An agreed position out of compared position is determined as a position contacted between layer 305 and substrate 308, so that the direction input through control knob 208 is determined. The electronic apparatus is controlled based on the direction determined.

When control knob 208 tilts, convex section 203 of operating section 200 has a structure not pushing moving-contact 314. This is the same as described in the fifth embodiment.

Figure 31:
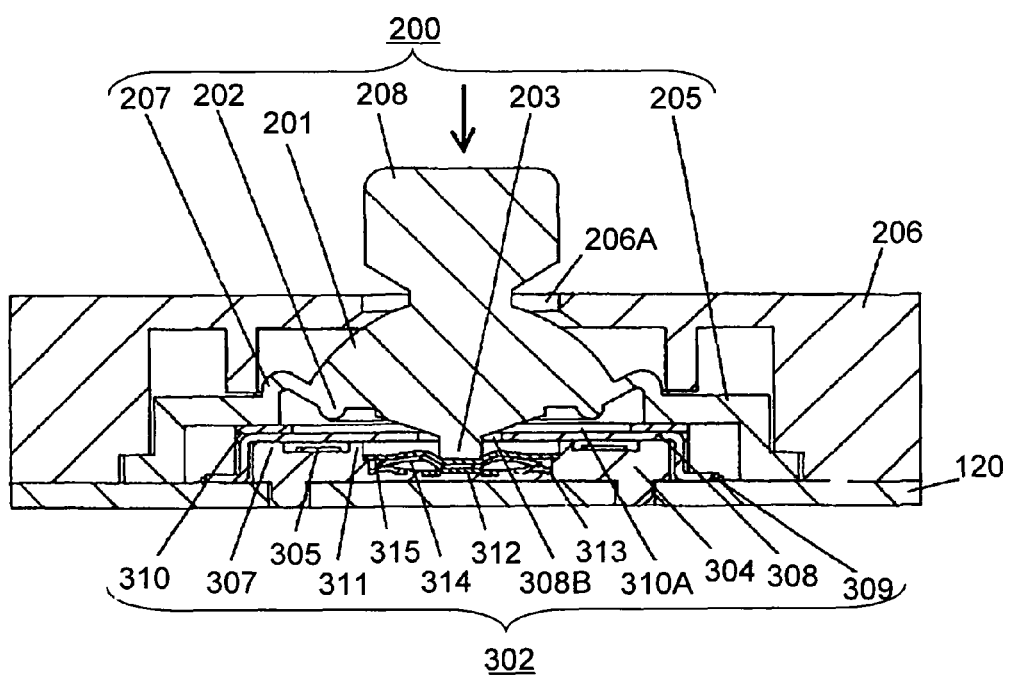
FIG. 31 is a sectional view showing a pressed operating section used in the electronic apparatus in accordance with the sixth embodiment of the invention.

When force pushing downward is applied to control knob 208, hemisphere section 201 moves downward, and flared resilient section 207 bows. A tip of section 203 of a lower section of section 201 comes in contact with an upper surface of adhesive tape 315 and pushes moving contact 314 downward. When the force exceeds given force, moving contact 314 bows downward with click-feeling. As shown in FIG. 31, the lower surface of moving contact 314 comes in contact with central contact 312. Central contact 312 conducts to outer contact 313 electrically, namely, switching terminal 312A conducts to switching terminal 313A electrically. When control knob 208 is pushed downward, ring-shaped protrusion 202 of operating section 200 does not come in contact with plane substrate 308.

The multidirectional input device and the electronic apparatus including the multidirectional input device of this embodiment can detect a tilt direction in any angle (360°) of operating section 200 at a high resolution as same as the fifth embodiment. A switching condition is changeable by pushing the operating section downward so that the high performance electronic apparatus simply operable can be achieved using the signal which is obtained by tilting or pushing the operating section.

In this embodiment, the multidirectional input device except for operating section 200 are formed of electronic component 302, so that the device can be smaller and thinner. The multidirectional input device of this embodiment is easy to operate, and can be mounted together with other components on printed circuit substrate 120. In this electronic component 302, parts operated by operating section 200 are formed of plane substrate 308 made of thin resilient metal substrate, so that plane substrate 308 is not necessarily to be assembled with operating section 200 in high accuracy, and yet all direction of operation can be detected. Even if the multidirectional input device is operated by operating section 200 repeatedly, plane substrate 308 can not be elongated or deformed largely, so that a stable operation is obtainable for a long period. Electronic component 302 discussed above has the switch, but the structure without the switch can be also used.

Exemplary Embodiment 7

Electronic component 102 of the seventh embodiment is the same as that of the fifth embodiment, but an operation of this embodiment differs from that of the fifth embodiment in the following points.

Figure 32:
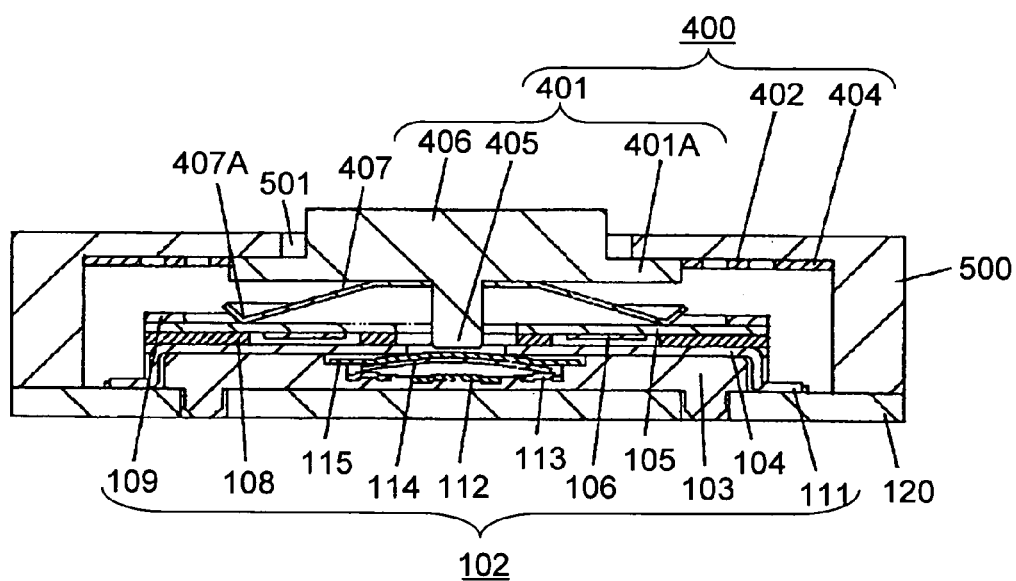
FIG. 32 shows a sectional view of an essential part of an electronic apparatus including a multidirectional input device in accordance with a seventh exemplary embodiment of the present invention.
Figure 33:
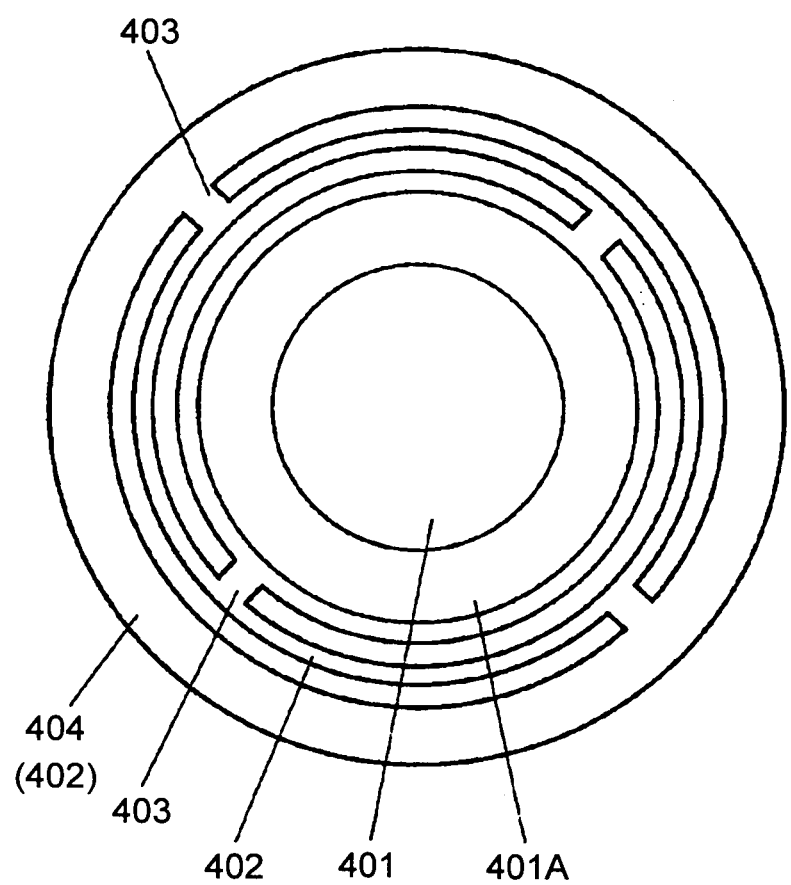
FIG. 33 shows a top view of an operating section as a main part of the electronic apparatus in accordance with the seventh embodiment of the invention.
Figure 34:
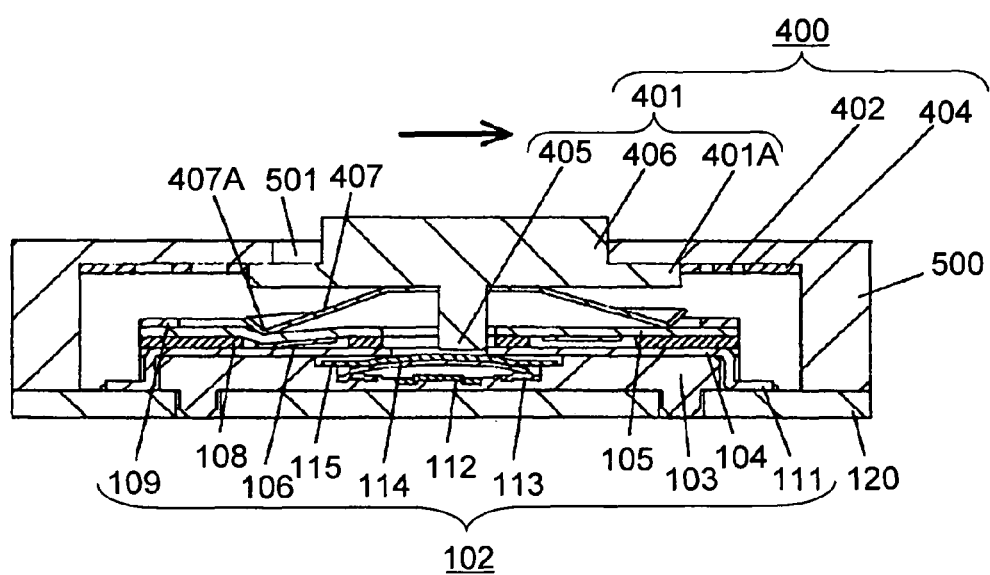
FIG. 34 is a sectional view showing a slid operating section used in the electronic apparatus in accordance with the seventh embodiment of the invention.
Figure 35:
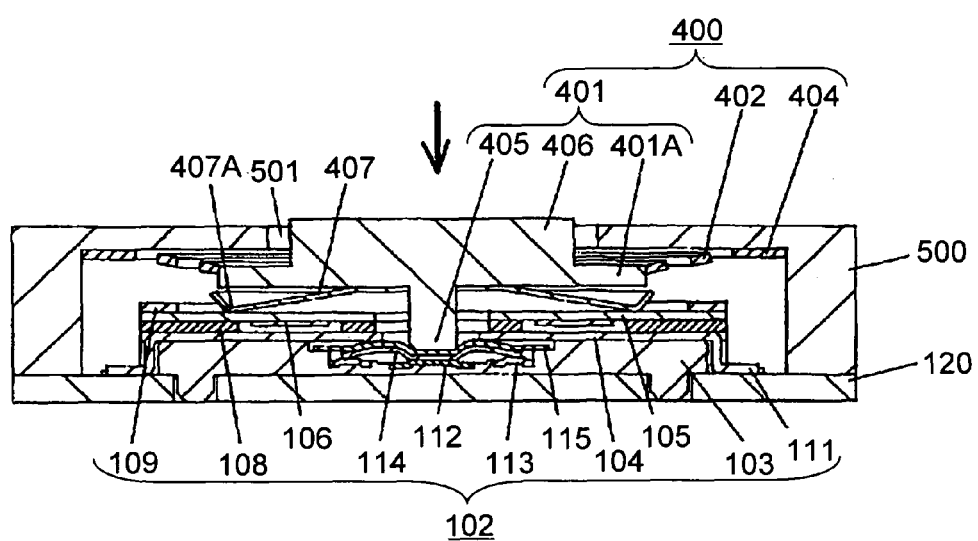
FIG. 35 is a sectional view showing a pressed operating section used in the electronic apparatus in accordance with the seventh embodiment of the invention.
Figure 36:
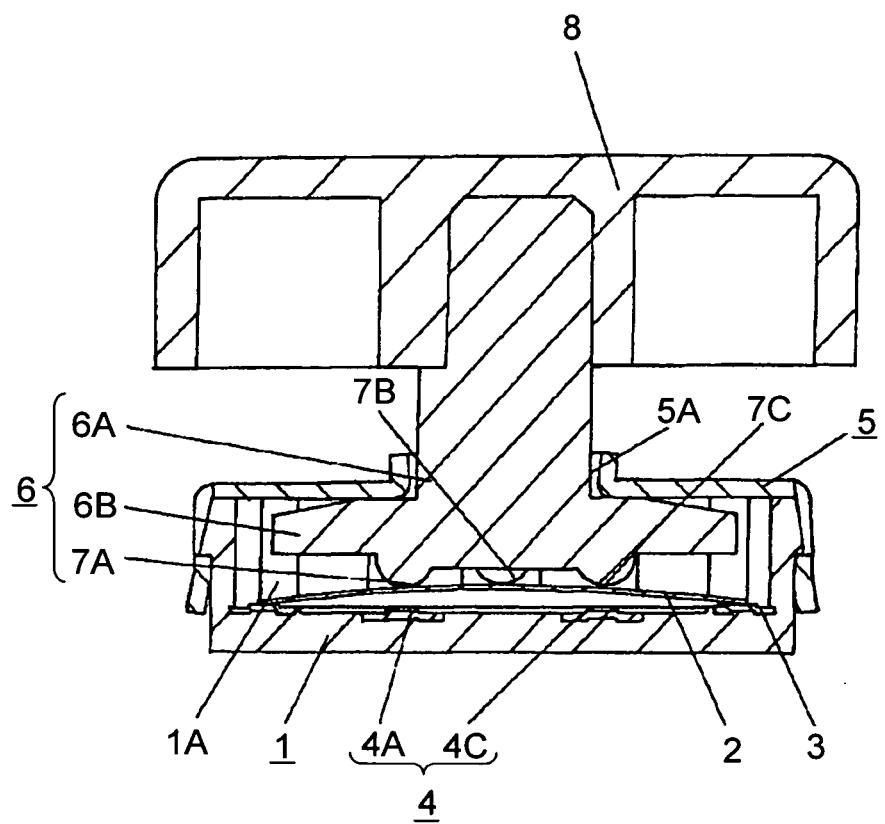
FIG. 36 shows a sectional view of a conventional multidirectional control switch as a multidirectional input component used in a multidirectional input device.
Figure 37:
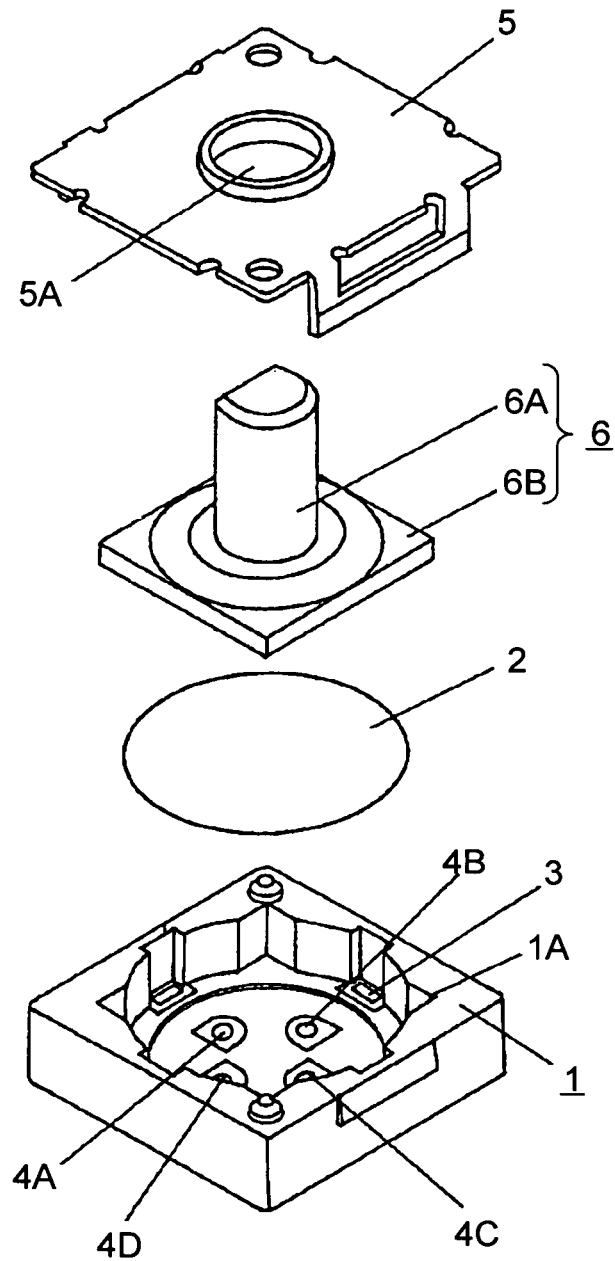
FIG. 37 shows an exploded perspective view of the conventional multidirectional control switch.
Figure 38:
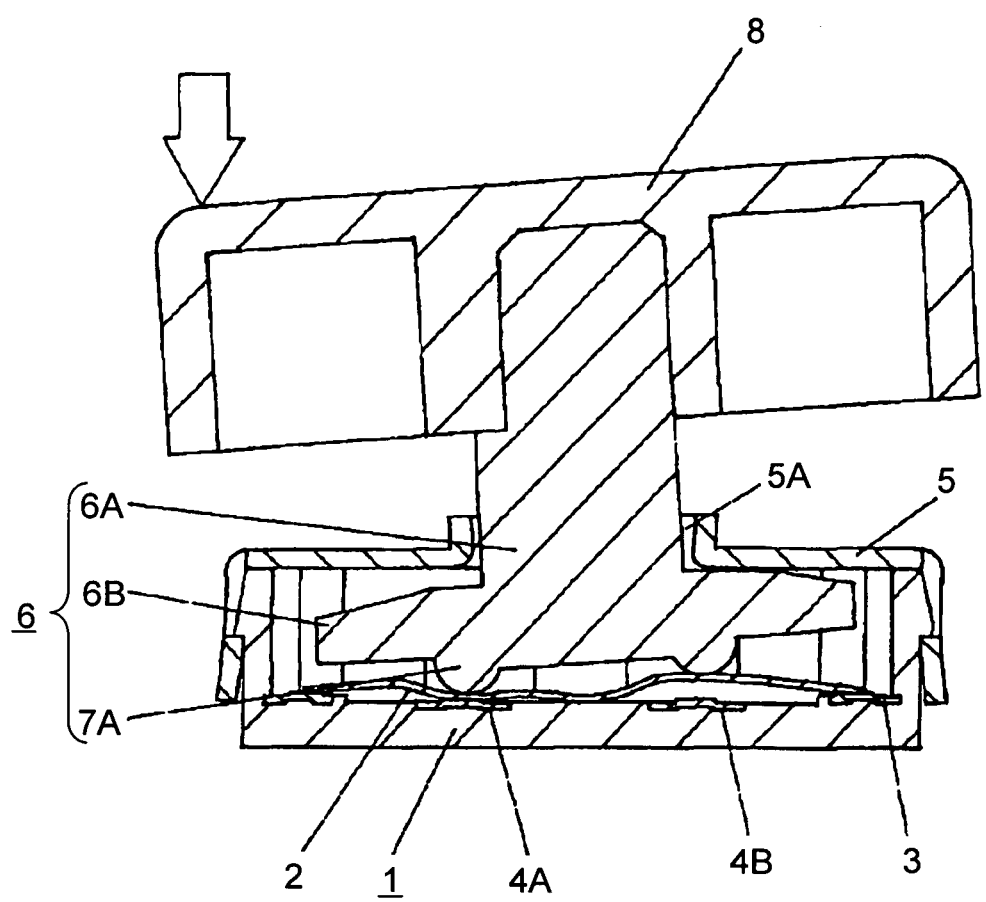
FIG. 38 is a sectional view showing a tilted operating section of the conventional multidirectional control switch.

FIG. 32 shows a sectional view of an essential part of an electronic apparatus including a multidirectional input device in accordance with the seventh exemplary embodiment of the present invention. As shown in FIG. 32, electronic component 102 for inputting multi directions is fixed at a given position of printed circuit substrate 120 by soldering. Operating section 400 made of resin is formed above electronic component 102, and can move vertically and parallel to printed circuit substrate 120. Operating section 400 is formed of circular controlling section 401 including brim 401A and a plurality of ring-shaped sections 402 formed concentrically outside of controlling section 401. As shown in FIG. 33, controlling section 401 is connected to ring-shaped sections 402 with bridge 403, and positions of bridges 403 are different at respective rings of ring-shaped sections 402.

Outermost ring-shaped section 404 is placed inside covering-material 500. Central convex section 405 of a lower central surface of circular controlling section 401 is spaced from a center of electronic component 102 at a given distance. Upper section 406 of circular controlling section 401 is protruded from aperture 501 of covering-material 500.

A diameter of central convex section 405 of circular controlling section 401 is slightly smaller than an inner diameter of resistance element layer 106. A diameter of brim 401A of circular controlling section 401 is larger than aperture 501 of covering-material 500. An upper surface of brim 401A is slidable and comes in contact with a lower surface of covering-material 500. Conical resilient member 407, which expands downward from central convex section 405, is placed beneath circular controlling section 401. Tip 407A of resilient member 407 comes in contact with an upper surface of insulating substrate 105, and the contact point is outside ring-shaped resistance element layer 106.

A diameter of a lower end of conical resilient member 407 is larger than a diameter of layer 106. When operating section 400 is not operated (it is described as an original condition), tip 407A comes in contact with insulating substrate 105, and tip 407A and resistance element layer 106 are concentric. Operating section 400 is energised by upward energising force, i.e., resilient force, of resilient member 407. The upper surface of brim 401A comes in contact with the lower surface of covering-material 500, so that a vertical position is determined.

The multidirectional input device of this embodiment is formed as mentioned above. An operation of the multidirectional input device is described as follows. FIG. 32 shows the original condition in which operating section 400 is not operated. Upper section 406 of controlling section 401 of operating section 400 is slid, namely, section 406 is moved parallel to printed circuit substrate 120, then an clearance between respective ring-shaped sections 402 becomes narrow, where the clearance is a space not connected by bridges 403. Controlling section 401 is slid till a side of controlling section 401 comes in contact with a side of aperture 501 of covering-material 500.

Resilient member 407 also moves in the same direction as controlling section 401. As shown in a sectional view of FIG. 34, tip 407A of resilient member 407 moves to a position of insulating substrate 105 of which lower surface is provided with layer 106 at a place corresponding to the position on the upper surface. The resilient force of resilient member 407 pushes insulating substrate 105 downward, so that a given position of resistance element layer 106 comes in contact with plane substrate 104. At that time, central convex section 405 of the lower surface of operating section 400 does not come in contact with moving contact 114, whereby a switch is kept remained. In the condition mentioned above, the detecting method used in this embodiment is the same as the fifth embodiment, therefore the description is omitted here. In this embodiment, because a direction opposite to an operating direction by 180° is detected, the correction is necessary to obtain the right direction.

When the force, which slides controlling section 401 of operating section 400, is removed, ring-shaped sections 402 return to an original shape, so that the multidirectional input device returns to the original condition shown in FIG. 32. When force pushing downward is applied to upper section 406 of controlling section 401 of operating section 400, central bridges 403 between ring-shaped sections 402 is slanted downward. Then controlling section 401 moves downward, which expands resilient member 407 outside resiliently, so that resistance element layer 106 is not pushed downward. As shown in a sectional view of FIG. 35, section 405 of the lower surface of controlling section 401 pushes moving contact 114, which is placed at a center of electronic component 102, via adhesive tape 115, so that the switch is turned ON.

When the force, which pushes operating section 400 downward, is removed, moving contact 114 returns to the original shape and the switch is turned OFF. Resilient member 407 also returns to the original shape. Bridges 403 between ring-shaped sections 402 return to the original shape paralleled to printed circuit substrate 120, so that the multidirectional input device returns to the original condition shown in FIG. 32. At that time, the upper surface of brim 401A of operating section 400 comes in contact with the lower surface of covering-material 500, and operating section 400 returns to the original position.

In this embodiment, operating section 400 is slid parallel to substrate 120 or pushed downward, and then electronic component 102 works. As a result, an exterior shape of the electronic apparatus becomes thinner than that of the fifth embodiment. A conical member is used as resilient member 407 of this embodiment, but other shapes can be used. For example, the same effect can be obtained using several arc-shaped resilient members.

A sliding direction of operating section 400 can be restricted in four directions crossed each other at right angles or eight directions equiangular. In the case mentioned above, only resilient members corresponding to the directions are prepared, and only one of the directions can be detected by the sliding operation. Electronic component 102 discussed above has the switch, but the structure without the switch can be also used. In this case, aperture 501 of covering-material 500 is closed by brim 401A of operating section 400, so that dust-proof effect is improved.

INDUSTRIAL APPLICABILITY

A multidirectional input device of this invention has a simple structure formed of a ring-shaped resistance element layer, a conductive section and a knob. As a result, the device is easy to be smaller and thinner, and angle information including a high resolution can be obtained in every operating direction of an operating section.

Since the multidirectional input device except for the operating section is formed of individual electronic components, the device can be mounted together with a circuit board and other components. As a result, an apparatus using the multidirectional input device can be downsized, and manufacturing processes thereof can be reduced.

This invention has several features as mentioned above, and is applicable to inputting devices of many kinds of electronic apparatuses, e.g., a cellular phone.

The invention claimed is:

1. A multidirectional input device comprising:
   an insulating substrate;
   a ring-shaped resistance element layer formed on said insulating substrate, said ring-shaped resistance element layer having at least three terminals electrically coupled thereto, wherein said ring-shaped resistance element layer is continuously circular and each one of the at least three terminals extends radially from said ring-shaped resistance element layer to a position along a perimeter of the said insulating substrate and at 90 degree intervals;
   a plane substrate spaced from said ring-shaped resistance element layer by an insulating space;
   a conductive section disposed on said plane substrate;
   an operating section operable to bring said ring-shaped resistance element layer into partial contact with said conductive section; and
   a controller, said controller operable to perform:
   a selection of a first pair of terminals from said at least three terminals,
   an application of a given voltage to said ring-shaped resistance element layer by applying the given voltage between the first pair of terminals,
   a first recognition of at least two contacted sections between said ring-shaped resistance element layer and said plane substrate based on the given voltage applied between the first pair of terminals,
   a selection of a second pair of terminals from said at least three terminals,
   an application of the given voltage between said second pair of terminals selected,
   a second recognition of the at least two contacted sections between said ring-shaped resistance element layer and said plane substrate based on the given voltage applied between the second pair of terminals, a comparison between a result of the first recognition with a result of the second recognition, and a determination of an agreed upon contacted position between said ring-shaped resistance element layer and said plane substrate based on said comparison.

2. The multidirectional input device of claim 1, wherein said plane substrate comprises a conductive metal substrate functioning as said conductive section.

3. The multidirectional input device of claim 2, wherein:
said conductive metal substrate comprises an output terminal;
said plane substrate is fixed to a casing;
a conductive resilient leg fixed to the casing is operable to resiliently come into contact with a terminal of said ring-shaped resistance element layer; and
when said ring-shaped resistance element layer partially comes in contact with said plane substrate by an operation of said operating section, a voltage is applied alternately to input terminals of the casing corresponding to the resilient legs, so that the voltage is applied to said ring-shaped resistance element layer, and a signal is thus obtained from said output terminal.

4. The multidirectional input device of claim 3, further comprising a central switch, wherein:
said insulating substrate has an aperture corresponding to a center of said ring-shaped resistance element layer;
said central switch corresponds to the aperture and is disposed on said plane substrate; and
said operating section operates said central switch through the aperture.

5. The multidirectional input device of claim 1, further comprising a central switch beneath said ring-shaped resistance element layer and located at a center of said ring-shaped resistance element layer.

6. The multidirectional input device of claim 1, further comprising a central switch at a center of said ring-shaped resistance element layer of said insulating substrate.

7. The multidirectional input device of claim 1, wherein said operating section is operable to tilt, and said ring-shaped resistance element layer contacts said conductive section by tilting said operating section so that an operating direction is detected.

8. An electronic apparatus comprising:
a top casing having a through-hole; and
a multidirectional input device including,
an insulating substrate,
a ring-shaped resistance element layer formed on said insulating substrate and having at least three terminals electrically coupled thereto, wherein said ring-shaped resistance element layer is continuously circular and each one of the at least three terminals extends radially from said ring-shaped resistance element layer to a position along a perimeter of the said insulating substrate and at 90 degree intervals, a plane substrate spaced from said ring-shaped resistance element layer by an insulating space,
a conductive section disposed on said plane substrate, wherein said ring-shaped resistance element layer contacts said conductive section,
an operating section operable to bring said ring-shaped resistance element layer into contact with said conductive section and disposed in the through-hole of said top casing, and
a controller, said controller operable to perform:
a selection of a first pair of terminals from said at least three terminals,
an application of the given voltage to said ring-shaped resistance element layer by applying the given voltage between the first pair of terminals,
a first recognition of at least two contacted sections between said ring-shaped resistance element layer and said plane substrate based on the given voltage applied between the first pair of terminals,
a selection of a second pair of terminals from said at least three terminals,
an application of the given voltage between said second pair of terminals selected,
a second recognition of the at least two contacted sections between said ring-shaped resistance element layer and said plane substrate based on the given voltage applied between the second pair of terminals,
a comparison between a result of the first recognition with a result of the second recognition, and
a determination of an agreed upon contacted position between said ring-shaped resistance element layer and said plane substrate based on said comparison.

9. The electronic apparatus of claim 8, further comprising a central contact section including a central switch.

10. The electronic apparatus of claim 8, wherein said operating section is operable to tilt, and said ring-shaped resistance element layer contacts said conductive section by tilting said operating section so that an operating direction is detected.

11. The electronic apparatus of claim 10, wherein when said ring-shaped resistance element layer contacts said conductive section by an operation of said operating section, a moving speed of one of a cursor and an icon along a direction corresponding to the contacted point is controlled such that the moving speed can change responsive to a result detected within a given time.

12. The electronic apparatus of claim 10, wherein when one of the signals from a substantially identical contacted point, at which said ring-shaped resistance element layer contacts said conductive section, is detected two times sequentially, and the signal is detected continuously for more than a given time, a moving speed of one of a cursor and an icon along a direction corresponding to the contacted point is controlled such that the moving speed can change.

* * * * *